(12) United States Patent
Takayama

(10) Patent No.: US 6,307,700 B1
(45) Date of Patent: Oct. 23, 2001

(54) TAPE RECORDING AND/OR REPRODUCING APPARATUS AND TAPE EJECTING METHOD

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/150,017

(22) Filed: Sep. 9, 1998

(30) Foreign Application Priority Data

Sep. 12, 1997 (JP) .................................................. 9-249149

(51) Int. Cl.⁷ .................................................. G11B 15/18
(52) U.S. Cl. .................................. 360/72.2; 360/69; 360/48
(58) Field of Search ................................ 360/48, 69, 71, 360/72.1, 74.1, 72.2, 74.4

(56) References Cited

U.S. PATENT DOCUMENTS

| | | | |
|---|---|---|---|
| 5,148,328 | 9/1992 | Kakuyama | 360/27 |
| 5,384,668 | 1/1995 | Shih et al. | 360/39 |
| 5,602,686 | * 2/1997 | Shih | 360/48 |
| 5,774,288 | 6/1998 | Kikuchi et al. | 360/48 |

FOREIGN PATENT DOCUMENTS 0504973     9/1992    (EP) .............................. G11B/27/00

* cited by examiner

Primary Examiner—Andrew L. Sniezek
(74) Attorney, Agent, or Firm—Jay H. Maioli

(57) ABSTRACT

A tape streaming drive capable of unloading and loading a tape in a shorter time. The tape streaming drive includes a motor driving and servo circuit 150 having the function of controlling the running of a magnetic tape, and a system controller 161 having the controlling function of the motor driving and servo circuit 150 for moving the magnetic tape to an ejection area provided in the last position of the partition directly previous to the current partition.

7 Claims, 19 Drawing Sheets

FIG.2A MAGNETIC TAPE

FIG.2B PARTITION

| | |
|---|---:|
| Raw Format ID | 16bit |
| Logical Format ID | 8bit |
| Logical Format ID — Last Frame ID | 1bit |
| Logical Format ID — ECC Frame ID | 1bit |
| Logical Format ID — Logical Frame Number | 6bit |
| Partition ID | 16bit |
| Area ID | 4bit |
| Data ID | 4bit |
| N-Position | 4bit |
| N-Repeats | 4bit |
| Group Count | 24bit |
| File-mark Count | 32bit |
| Save-Set Mark Count | 32bit |
| Record Count | 32bit |
| Absolute Frame Count | 24bit |
| Reserved | |

FIG.9

| bit 3210 | Definition |
|---|---|
| 0000(0) | Device Area |
| 0001(1) | Reference Area |
| 0010(2) | System Area |
| 0011(3) | Reserved |
| 0100(4) | Data Area |
| 0101(5) | EOD Area |
| 0110(6) | Reserved |
| 0111(7) | Option Device Area |

FIG.10

TAPE RECORDING AND/OR REPRODUCING APPARATUS AND TAPE EJECTING METHOD

BACKGROUND OF THE INVENTION

1. Field of the Invention

This invention relates to a tape recording and/or reproducing apparatus for allowing data recorded on a tape-shaped recording medium to be comprehended easily, and a tape recording and/or reproducing method.

2. Description of the Related Art

Among known recording/reproducing apparatus capable of recording and reproducing digital data for a magnetic tape, there is a so-called tape streaming drive. This tape streaming drive can have an enormous recording capacity of, for example, tens to hundreds of gigabytes, depending on the tape length of a tape cassette as a recording medium. By this reason, the tape streaming drive is widely used for backup of data recorded on a recording medium, such as a hard disc of a main body unit of an electronic computer. The tape streaming drive is considered to be satisfactorily used for saving picture data of a larger data size.

As a tape streaming drive, there has been proposed one which records/reproduces data on, for example, an 8 mm-VTR tape cassette as a recording medium in accordance with a helical scan system by a rotary head.

Usually, a magnetic tape for data recording and reproduction by the tape streaming drive is wound on a reel rotatably mounted within a cassette casing. The magnetic tape is preserved by being housed within, for example, a tape cassette.

The tape cassette has a rotatably mounted reel on which the magnetic tape is wound and preserved. The tape cassette can have one or two reels.

With the tape cassette having only one reel, the tape has to be rewound before ejecting the tape cassette from the tape streaming drive.

With the tape cassette having two reels, the magnetic tape desirably is taken up in its entirety on one or the other reel. Moreover, since contaminants tend to be deposited if the data recording surface is exposed to the outside a prolonged time, even though the tape cassette is housed in the cartridge, the magnetic tape is usually rewound up to its leading end and is ejected in this state from the tape streaming drive.

Although the tape is rewound for the above reason, tape rewinding takes time depending on the tape length. This is not desirable in applications in need of frequent tape cassette exchange operations.

It may be occasionally desired to record data on a magnetic tape or reproduce data recorded on the magnetic tape under an environment in which contaminants have been removed to a required level without expecting prolonged storage. This type of the tape streaming drive is meritorious in application wherein the tape cassette loading time and tape cassette unloading time are shortened and the tape cassette is exchanged frequently.

If the magnetic tape is rewound frequently in the tape cassette, it may be feared that loading and unloading become extremely time-consuming.

SUMMARY OF THE INVENTION

It is therefore an object of the present invention to provide a tape recording and/or reproducing apparatus and a tape recording and/or reproducing method whereby tape unloading and loading can be realized in a shorter time.

In one aspect, the present invention provides an apparatus for recording and/or reproducing data on or from a tape cassette holding therein a tape-shaped recording medium having at least two partitions in each of which are recorded data, in which the apparatus includes running control means for controlling the running of the tape-shaped recording medium, and system controlling means for controlling the running control means so that the tape cassette is ejected after moving the tape-shaped recording medium to an ejection area provided at the last position in a partition directly preceding the currently prevailing partition.

By the above structure of the tape recording and/or reproducing apparatus, the tape-shaped recording medium is fed, for ejecting the tape cassette, to an ejection area provided at the last position in a partition directly previous to a current partition prior to the ejection operation.

In another aspect, the present invention provides a method for ejecting a tape cassette holding therein a tape-shaped recording medium having at least two partitions in each of which are recorded data, in which the method includes a tape movement step of moving the tape-shaped recording medium to an ejection area provided in the last position in a partition directly previous to a current partition and an ejection step of ejecting the tape cassette after the tape-shaped recording medium has been moved to the ejection area.

By the above structure of the ejection method, the tape-shaped recording medium is fed, for ejecting the tape cassette, to an ejection area provided at the last position in a partition directly previous to a current partition prior to the ejection operation.

BRIEF DESCRIPTION OF THE DRAWINGS

FIG. 9 shows the ID area information on the magnetic tape.

FIG. 10 illustrates the definition of an area ID contained in the ID area information.

DESCRIPTION OF THE PREFERRED EMBODIMENTS

Figure 1:
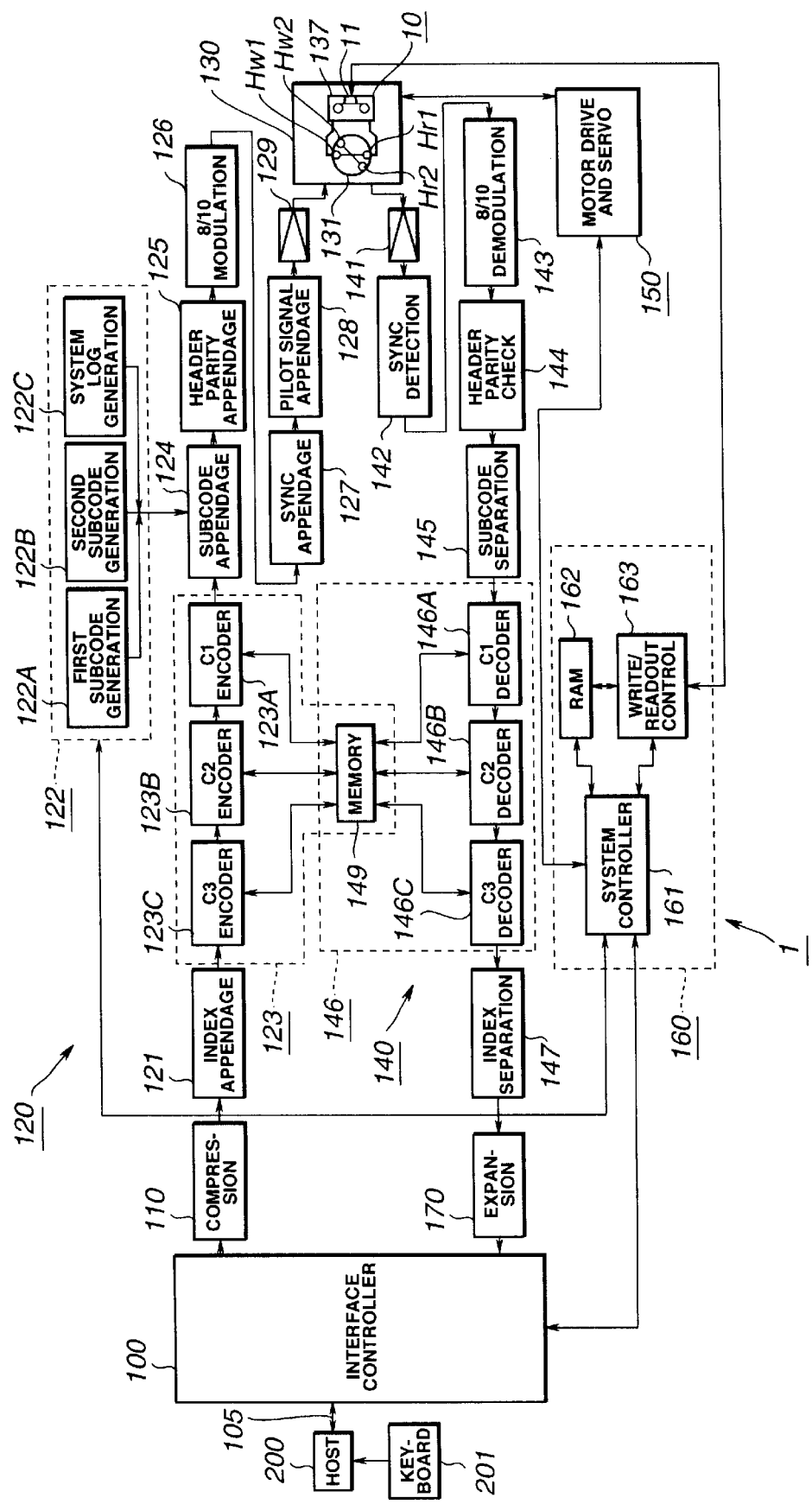
FIG. 1 is a block circuit diagram showing the structure of a tape streaming drive embodying the present invention.

Referring to the drawings, a preferred embodiment of the present invention will be explained in detail.

The illustrated embodiment is a tape streaming drive adapted for recording and/or reproducing recording data on or from a tape cassette including a magnetic tape provided with at least two partitions each of which has recording data recorded therein.

Referring to FIG. 1, this tape streaming drive includes a motor driving and servo circuit 150 having the function of controlling the running of the magnetic tape and a system controller 161 having the function of controlling the motor driving and servo circuit 150 for moving the magnetic tape to an ejection area provided at the trailing end position on the partition directly previous to the current partition to discharge the tape cassette.

The motor driving and servo circuit 150 also has the function of controlling the tracking and the running of the magnetic tape. The running control of the magnetic tape is to control the rotation of the pinch roll or the reel about which is wound the magnetic tape.

The system controller 161 controls various circuits and, for example, controls the driving of the motor driving and servo circuit 150.

It is noted that a plurality of partitions are provided in succession in the recording/reproducing direction. An optional device area as an ejection area is provided at a trailing end position of all partitions excluding the trailing end partition, and a device area as later explained is provided at a position directly before the leading end partition.

Specifically, the partition directly previous to a partition is such a partition provided next to the current partition in a direction opposite to the recording/reproducing direction.

For unloading and loading, the above-described tape streaming drive 1 feeds the magnetic tape to an ejection area of a partition directly previous to the partition prior to the unloading command. The tape cassette is then ejected from the tape streaming drive 1. This allows the tape streaming drive 1 to carry out the unloading and loading operations speedily, as will be explained in detail after explanation of the schematics of the tape streaming drive 1.

The tape streaming drive 1, shown in FIG. 1, includes an interface controller 100, a recording data processing system 120 for processing input data entered via this interface controller 100, and a recording/reproducing unit 130 for recording signals sent from the recording data processing system 120 on the magnetic tape and for reproducing the magnetic tape. The tape streaming drive 1 also includes a playback data processing system 140 for processing the playback output from the recording/reproducing unit 130 to reproduce the data recorded on the magnetic tape, a motor driving and servo circuit 150 for controlling the tape running system of the recording/reproducing unit 130 and a recording data management unit 160 for supervising recording data recorded on the magnetic tape.

The tape cassette 10 used in the present tape streaming drive has a semiconductor memory as a memory element for storage of the system log or the identification information for discriminating data recorded on the magnetic tape. The semiconductor memory is depicted as a memory-in-cassette (MIC) 11.

In the present tape streaming drive, the interface controller 100 is a so-called small computer system interface (SCSI) and routes data sent from an external information processing apparatus, such as a personal computer or a work station, to the recording data processing system 120, while routing the recording data reproduced from the playback data processing system 140 to the information processing apparatus.

In the present tape streaming drive, data are sequentially entered during data recording from a host computer 200 via SCSI interface controller 100 in transmission data units termed a fixed-length record as later explained and are then supplied to a compression circuit 110. Although there is such a mode in the tape streaming drive in which data is transmitted from the host computer 200 by collective units of variable-length data, it is not explained herein specifically. To the host computer 200 is connected a keyboard 201.

The compression circuit 110 compresses input data, if necessary, in accordance with a defined compression system. If a compression system by the LZ code, for example, is used as a compression system, dedicated codes are allocated to strings processed in the past and stored in the form of a dictionary. The strings entered subsequently are compared to the contents in the dictionary. If the string of the input data coincides with the dictionary code, the string data is replaced by the dictionary codes. Data of input strings not coincident with the dictionary are sequentially given new codes and registered in the dictionary. The string data are replaced in this manner by dictionary codes to realize data compression.

The recording data processing system 120 includes an index appendage circuit 121 for appending the index information to the recording data supplied thereto via interface controller 100, a subcode generating unit 122 for generating subcodes, an error correction code generator 123 for encoding recording data from the index appendage circuit 121 with error correction codes, and a subcode appendage unit 124 for appending the subcode and the block address from the subcode generating unit 122.

The subcode generating unit 122 includes first and second subcode generators 122A, 122B, and a system log generator 122C. The error correction code generator 123 includes a memory 149, a C1 encoder 123A, a C2 encoder 123B and a C3 encoder 123C.

This recording data processing system 120 includes a header parity appendage unit 125 for appending a header parity to the recording data from the subcode appendage unit 124, an 8/10 modulator 126 for eight to ten modulating the recording data supplied from the header parity appendage unit 125, a synchronization signal appendage unit 127 for appending synchronization signals to the recording data sent from the 8/10 modulator 126, a pilot signal appendage unit 128 for appending pilot signals for automatic track following (ATF) to the recording data supplied from the synchronization signal appendage unit 127 and an amplifier 129 for amplifying recording data routed from the pilot signal appendage unit 128.

The recording/reproducing unit 130 also includes a rotary drum 131 for rotating two recording magnetic heads Hw1, Hw2 with respective different azimuth angles and two reproducing magnetic heads Hr1, Hr2 with respective different azimuth angles at an inclination relative to the magnetic tape 12. These two pairs of the magnetic heads Hw1, Hw2, Hr1, Hr2 are mounted in proximity to the circumferential direction of the rotary drum 131 at a spacing of a track pitch Tp along the axial direction of the rotary drum 131, that is along the track width direction.

The reproducing data system 140 includes an amplifier 141 for amplifying a playback output of the inclined tracks of the magnetic tape 12 sent from the recording/reproducing unit 130, and a synchronization signal detection unit 142 for detecting the synchronization signal from the playback output supplied from the amplifier 141, converting the playback output into bi-level signals, correcting the resulting signals for jitter and outputting the resulting signals. The reproducing data system 140 also includes an 8/10 modulator 143 for eight-to-ten modulating the bi-level playback signals from the synchronization signal detection unit 142 and a parity check unit 144 for checking the header parity of the playback data from the 8/10 demodulator 143.

The reproducing data system 140 further includes a subcode separation unit 145 for separating the subcode from the playback data from the header parity check unit 144, an error correction unit 146 for correcting the playback data from the subcode separation unit 145 freed of the subcode and an index separation unit 147 for separating the index from the payback data corrected for errors by the error correction unit 146. The error correction unit 146 is made up of a memory 149, a C1 decoder 146A, a c2 decoder 146B and a c3 decoder 146C.

The motor driving and servo circuit 150 includes a PC detection unit, fed from the recording/reproducing unit 130 with PG pulses which are in meeting with the rpm of the rotary drum 131, a speed error detection unit for detecting the speed error from a detection output of the PG detection unit, a pilot signal detection unit for detecting the speed error from a detection output of the PG sensor, an addition unit for adding the detection outputs of the speed error detection unit and the pilot signal detection unit, a tracking servo circuit for generating tracking servo signals based on the addition output of the addition unit and a capstan driving circuit for controlling the tape running system of the recording/reproducing unit 130 based on the tracking servo signals.

The motor driving and servo circuit 150 includes driving operating means for rotating a reel rotatably mounted on the tape cassette.

The motor driving and servo circuit 150 can control the driving control means to feed out the magnetic tape 12 to a predetermined position. For example, the magnetic tape can be fed at an elevated speed to the optional device area as later explained.

The motor driving and servo circuit 150 has its operation controlled by the system controller 161.

The recording data management unit 160 has the system controller 161 for processing management of data recorded on the magnetic tape, a RAM 162 holding the identification information and a write/readout control unit 163 for controlling the writing/readout on or from the RAM 162 via the recording/reproducing unit 130.

The system controller 161 writes in the RAM 162 the system log for supervising the partition provided on the magnetic tape and the file recorded on the magnetic tape. The writing/readout controller 163 reads out the system log stored in the RAM 162 to send the system log stored in the RAM 162 via recording/reproducing unit 130 to the MIC 11 while writing the system log read out from the MIC 11 in the RAM 162.

Based on the judgment by the system controller 161, an expansion circuit 170 expands data compressed by a compression circuit 110 during recording, while allowing non-compressed data to be passed therethrough without data expansion.

Output data of the expansion circuit 170 is outputted via SCSI interface 101 as playback data to a host computer 200.

FIG. 1 also shows a MIC 11 provided on the tape cassette 10. When the main body unit of the tape cassette is loaded on the tape streaming drive, the MIC 11 is connected via terminal pin or the like to the system controller 161 to permit data input/output to or from the system controller 161.

The MIC 11 also has information transmission between it and the outside host computer 200 using a SCSI command. Thus, there is no necessity of providing a dedicated line between the MIC 11 and the host computer 200 and ultimately data exchange between the tape cassette and the host computer 200 can be realized solely via a SCSI interface controller The operation of the above-described tape streaming drive is hereinafter explained.

For recording, the tape streaming drive is fed via the SCSI interface controller 100 with the recording data from an information processing apparatus such as the personal computer or the work station. If fed with recording data over bus 105, the SCSI interface controller 100 sends the supplied recording data to an index appendage circuit 121 and to a subcode generator 122.

If fed with recording data from the SCSI interface controller 100, the index appendage circuit 121 appends the index information for discriminating a series of recording data, for each unit of 40 tracks or 20 frames, and routes the resulting data to an error correction code generator 123.

The error correction code generator 123 transiently stores the recording data sent from the index appendage circuit 121 in the memory 149 on the unit basis. The C3 encoder 123C generates the error correction code C3 of a data string corresponding to the track width direction for unit-based recording data stored in the memory 149 to allocate the error correction code C3 in the last two tracks of the 40 tracks of the data unit. The C2 encoder 123B generates an error correction code C2 of the data string in the track direction and splits the error correction code C2 into two to allocate the two portions in both end portions of the data area of each track. The C1 encoder 123A generates the block-based error correction code C1.

A first sub-code generator 122A of a subcode generating unit 122 generates, based on the recording data entered via the SCSI interface controller 100, a separator count as the division information specifying the division of the recording data and the record count specifying the number of records. A second subcode generator 122B of the subcode generating unit 122 generates, along with the block addresses, area IDs specifying respective areas defined in the tape format, frame numbers, group counts specifying the number of record units and the check sum. A system log generator 122C generates a partition-based system log (hysteresis information), prescribed as the above-mentioned tape format.

The subcode appendage unit 124 appends the subcode and the block address supplied from the subcode generating unit 122 to the recording data to which the error correction codes C3, C2 and C1 have been appended by the error correction code generator 123. This allocates the subcode and the block address to the second domain of each block. The subcode appendage unit 124 allocates the area ID and the block address generated in the second subcode generator 122B to the sub-area of each block. The subcode appendage unit 124 constructs sub-data from the count value generated by the first subcode generator 122A, an area ID generated by the second subcode generator 122B, group count and the check sum to allocate the sub-data to the sub-area of each block.

The header parity appendage unit 125 generates a 2-byte parity for error correction for the subcode and the block address appended to the recording data by the subcode appendage unit 124, and appends the 2-byte parity to the recording data. This allocates the 2-byte parity to the third domain of each block.

The 8/10 modulation unit 126 converts the block data, to which the header parity and the block address have been appended by the header parity appendage unit 125, from 8 bits to 10 bits, on the byte basis, in order to maintain the dc level of the recording signals substantially at a zero level.

The synchronization signal appendage unit 127 appends the synchronization signals, on the block basis, to the recording data converted by the 8/10 modulation unit 126 into 10 bits. This allocates the synchronization signals to the first domain of each block. The recording data, thus formed, is sent to a pilot signal appendage unit 128.

The pilot signal appendage unit 128 generates pilot signals for ATF, appends these pilot signals for ATF to the recording data and sends the resulting signals via amplifier 129 to magnetic heads Hw1 and Hw2. This allows the magnetic heads Hw1 and Hw2 to scan the magnetic tape to effect the recording to produce recording tracks on the magnetic tape in accordance with a predetermined format.

It is also possible to formulate partitions in advance on the magnetic tape 12, in which case the system controller 161 formulates partitions on the magnetic tape and the partition management information indicating e.g., the number of partitions or the start positions of the partitions, in this order, to write the resulting management information on the RAM 162.

If the directory has been formulated, deleted or modified in the partition, or if the file has been recorded, deleted or modified in the directory, the system controller 161 reads out the identification information from the RAM 162 to modify the identification information thus read out depending on the recording to write the modified data in a RAM 162. For recording, deleting or modifying the files, the system controller 161 reads out the management information used for supervising the recording position of each file and modifies the information thus read out depending on the new recording position of the file to write the modified data in the RAM 162.

If the management information for each partition stored in the RAM 162, the management information of each file and the management information for supervising the recording position of each file is updated, the writing/readout controller 163 writes the management information of each partition in the MIC 11 via a connector 137 and a connection terminal 63 of the recording/reproducing unit 130.

This records the data on the file basis on the magnetic tape 12, while recording the identification information of each file recorded on the magnetic tape 12 on the MIC 11.

For generating data across plural tape cassettes 10, the system controller 161 generates the information concerning all tape cassettes 10 carrying recorded data, the identification information for discriminating each tape cassette 10 carrying recorded data and the identification information for discriminating the data recorded in each tape cassette 10. The writing/readout controller 163 stores these items of the identification information in the RAM 162.

If, for reproducing the magnetic tape, carrying recorded signals as described above, the tape cassette 10 is loaded on the recording/reproducing unit 130 of the tape streaming drive, the contact terminal 63 is connected via connector 137 to the writing/readout controller 163.

The writing/readout controller 163 reads out the above-mentioned management information, identification information for each individual file and the management information for supervising the recording position of each file from the MIC 11 to write the information thus read out in the RAM 162.

On reception of the magnetic tape 12 from the system controller 161, the recording/reproducing unit 130 controls the rotation of the rotary drum 131 so that the rpm of the rotary drum 131 will be equal to that during recording, while controlling the running of the magnetic tape 12 so that the magnetic tape 12 will run at a predetermined speed. Thus, the reproducing recording heads Hr1, Hr2 azimuth-scans the magnetic tape to send the playback output corresponding to the scanning of the recording track via amplifier 141 to a synchronization signal detection unit 142. The synchronization signal detection unit 142 detects the synchronization signal from the routed playback output to convert the playback output to bi-level signals by clocks synchronized with the synchronization signals to generate playback data which is supplied to the 8/10 demodulation unit 143.

The 8/10 demodulation unit 143 converts the playback data from the synchronization signal detection unit 142 from 10-bit data to 8-bit data which is sent to a header parity check unit 144. The header parity check unit 144 parity-checks the block address and the subcode using the above-mentioned 2-byte header parity. A subcode separation unit 145 separates from the playback data the correct subcode parity-checked by the header parity check unit 144 to send the playback data separated from the subcode to the memory 149 by the system controller 161.

The memory 149 transiently stores the playback data having the index information appended thereto, unit by unit, with 40 tracks, that is 20 frames, of the playback data, stored in the memory 149, as a unit. Based on the unit-based playback data, stored in the memory 149, the C1 decoder 146A corrects the playback data of each block for errors.

The C2 decoder 146B corrects a data string along the track direction in the unit-based playback data, corrected for errors by the C1 decoder 146A, using the error correction code C2 appended to each end portion of the playback data area of each track. The C3 decoder 146C corrects a data string along the track width direction in the unit-based playback data, corrected for errors by the C2 decoder 146B, using the error correction code C3 allocated to the last two tracks of the one unit of 40 tracks.

Since the present tape streaming drive corrects the playback data for errors, using the error correction codes C1, C2 and C3, the playback data can be reliably corrected to improve data reliability.

An index separation unit 147 separates the index information from the unit-based playback data, corrected for errors by an error correction unit 146 as described above, to route the separated index information to the system controller 161 in order to separate the index information and in order to send the playback data to the interface controller 100.

The interface controller 100 sends the playback data from an index separation unit 147 over a bus 105 to a host computer 200, such as a personal computer or a workstation.

Figure 2:
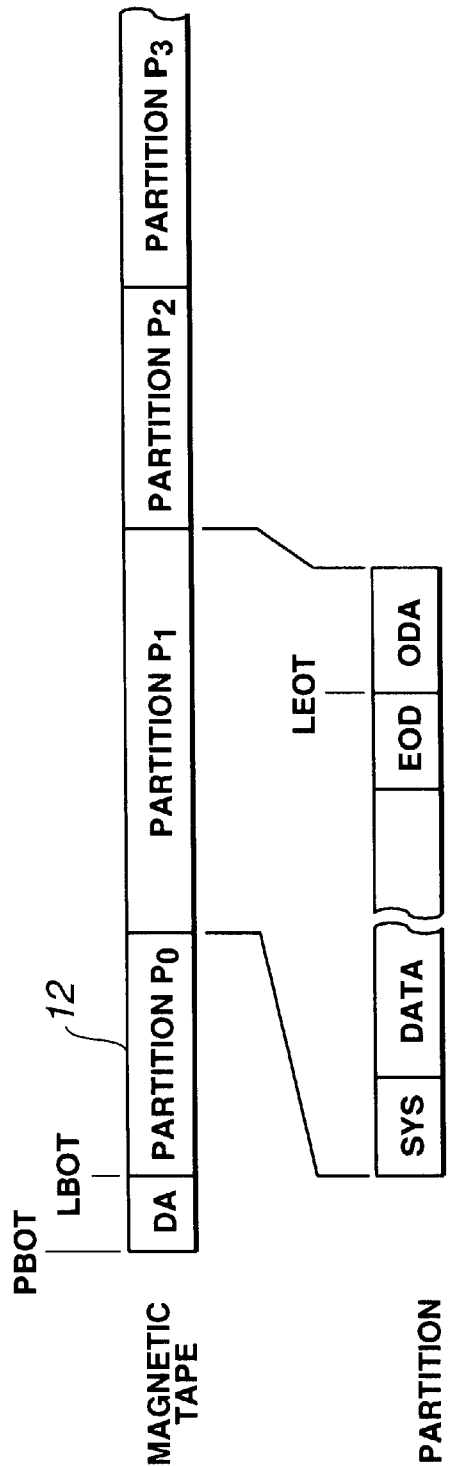
FIG. 2 is showing a data structure of a magnetic tape for which data is written or read by the tape streaming drive of FIG. 1.

FIG. 2 shows the structure of data recorded on the magnetic tape 12. In FIG. 2a, a sole magnetic tape 12 is shown only schematically. In the present embodiment, a sole magnetic tape 3 can be divided in terms of a partition as a unit. A first partition P0 is arranged next to a device area DA as from the leading end of the tape. The partition P0 is followed by partitions P1, P2, P3, . . . in this order, depending on the number of times of division of the partitions. In the system of the present embodiment, up to a maximum number of 256 partitions can be set and supervised. The subscripts of the partitions P0, P1, P2, P3, . . . , that is n of Pn, denote partition numbers. In the present embodiment, data recording/reproduction can be made independently from one partition to another.

The partition Pn, where n=0, 1, 2, . . . , is made up of a system area SYS, a data area DATA, end-of-data EOD and an optional device area ODA, as shown in FIG. 2b.

A more specified structure of recording data of the magnetic tape is explained with reference to FIG. 3.

Figure 3:
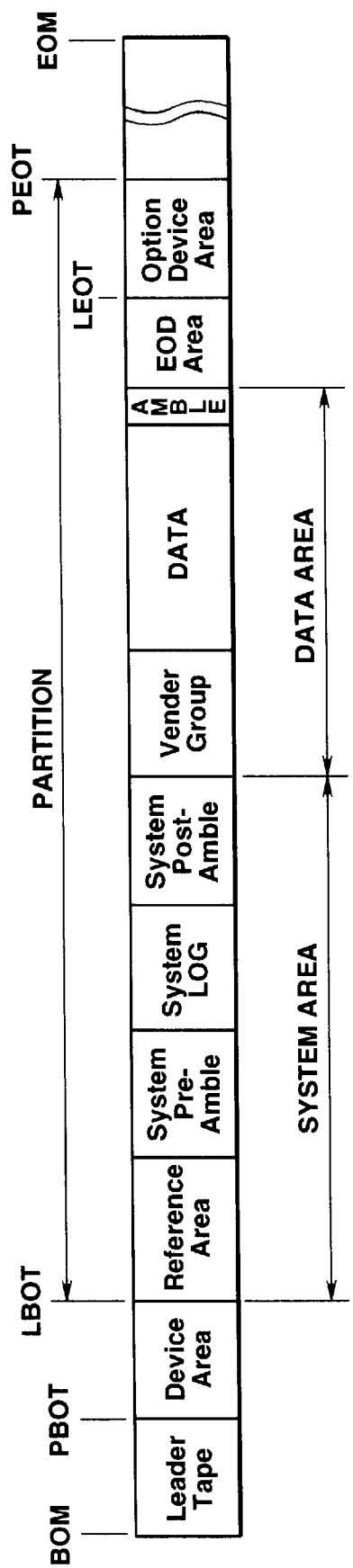
FIG. 3 is showing a data structure of a data partition of plural partitions formed in the magnetic tape.

Between the physical beginning of the tape (PBOT) and the logical beginning of the tape LBOT of the first partition P0 of the tape of FIG. 3, there is provided a device area for loading/unloading of a tape cassette. Next to this device area is a system area in which to store the use hysteresis information of the tape, followed by a data area. The beginning end of the system area is the logical beginning of the tape LBOT.

In this data area is provided a vender group specifying the information concerning the vender who first formulates and supplies the data. The vender group is followed by an amble frame and the data area in this order.

Next to the data area is an end of data area specifying the end of the data area of the partition. The trailing end of the EOD is the logical end of the tape LEOT. The physical end of the tape PEOT specifies the physical end position of the tape or the partition.

An optional device area is provided between the logical end of the tape LEOT and the physical end of the tape PEOT as the end position of the partition.

The optional device area is the loading/unloading position of the tape cassette, as described above, and is an area provided from one partition to another. It is in this area that the position information of the partition to which belongs the optional device area is recorded. For example, the position of the neighboring partition can be confirmed by this position information. For example, the position information is recorded in an ID area in the optional device area.

Meanwhile, the optional device area is provided at the trailing end position of each partition excluding the last partition as an ejection area for ejection of the tape cassette. Directly before the leading end partition, that is at the physical beginning end of the magnetic tape, there is provided an ejection area for tape cassette ejection. This ejection area is the above-mentioned device area.

Figure 4A:
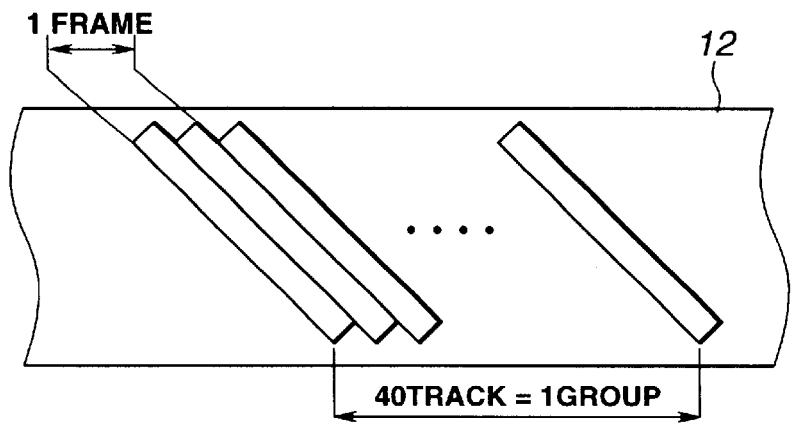
FIG. 4 shows a data structure of a sole track of the magnetic tape.

On the tape 12 are sequentially recorded and formed azimuth recording tracks by the rotary head 131, as shown in FIG. 4. Plural groups, each composed of 40 tracks or 20 frames, make up a sole partition. That is, plural data recording units in a partition make up a group composed of 20 frames or 40 tracks as shown in FIG. 4A.

Figure 4B:
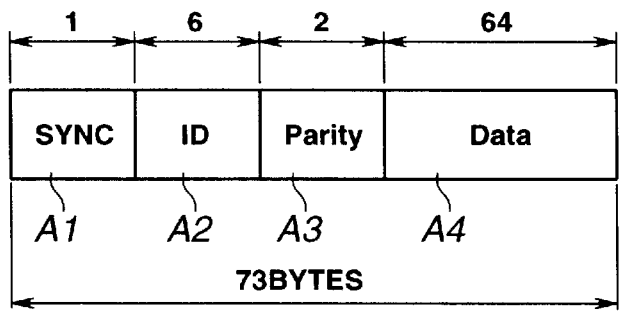
Figure 4C:
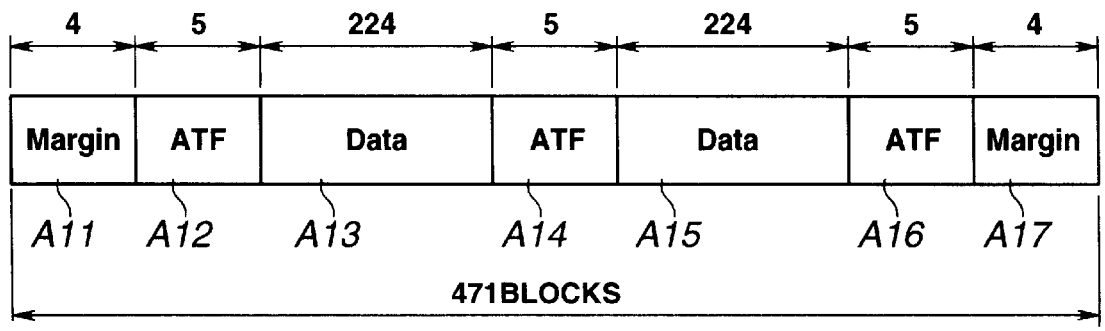

Each track is divided into blocks having a data structure shown in FIG. 4B. 471 of these blocks make up the track. That is, FIG. 4B shows a data structure in one block. Each block is made up of a 1-byte SYNC data area A1, followed by a 6-byte ID area A2, used for search, a 2-byte parity area A3 for error correction for ID data, and a 64-byte data area A4. Each track is made up of a sum total of 471 blocks, as shown in FIG. 4C. Each track has, on its both ends, 4-block marginal areas A11 and A17. At back of the marginal area A11 and ahead of the marginal area A17 are provided track controlling ATF areas A12, A16. At a mid portion of each track is an ATF area A14. five blocks each are provided as these ATF areas A12, A14 and A16. A data area A13 of 224 blocks is provided between the ATF areas A12 and A14, while a data area A15 of 224 blocks is similarly provided between the ATF areas A14 and A16. Thus, the total data areas in one frame (A13 and A15) take up 224×2=448 blocks of the sum total of 471 blocks.

In the present tape streaming drive 1, the above-mentioned data area is divided into 448 73-byte blocks. Each block is divided into a first 1-byte area for recording synchronization signals, a second 6-byte area for recording IDs, a 2-byte third area for recording the header parity and a fourth 64-byte area for recording data. The subcode and the block address are recorded from block to block along with the data.

Figure 5:
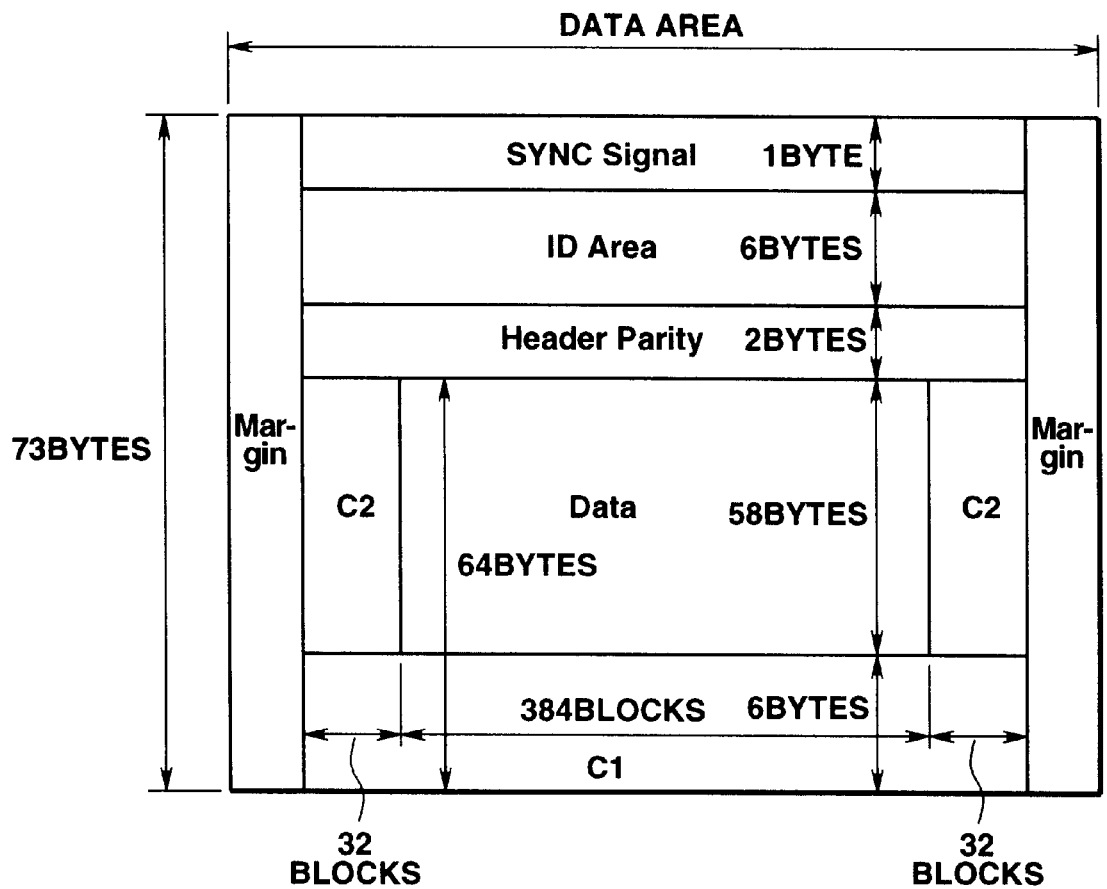
FIG. 5 shows a data structure of a sole track of data recorded on a magnetic tape by the tape streaming drive of FIG. 1.
Figure 6:
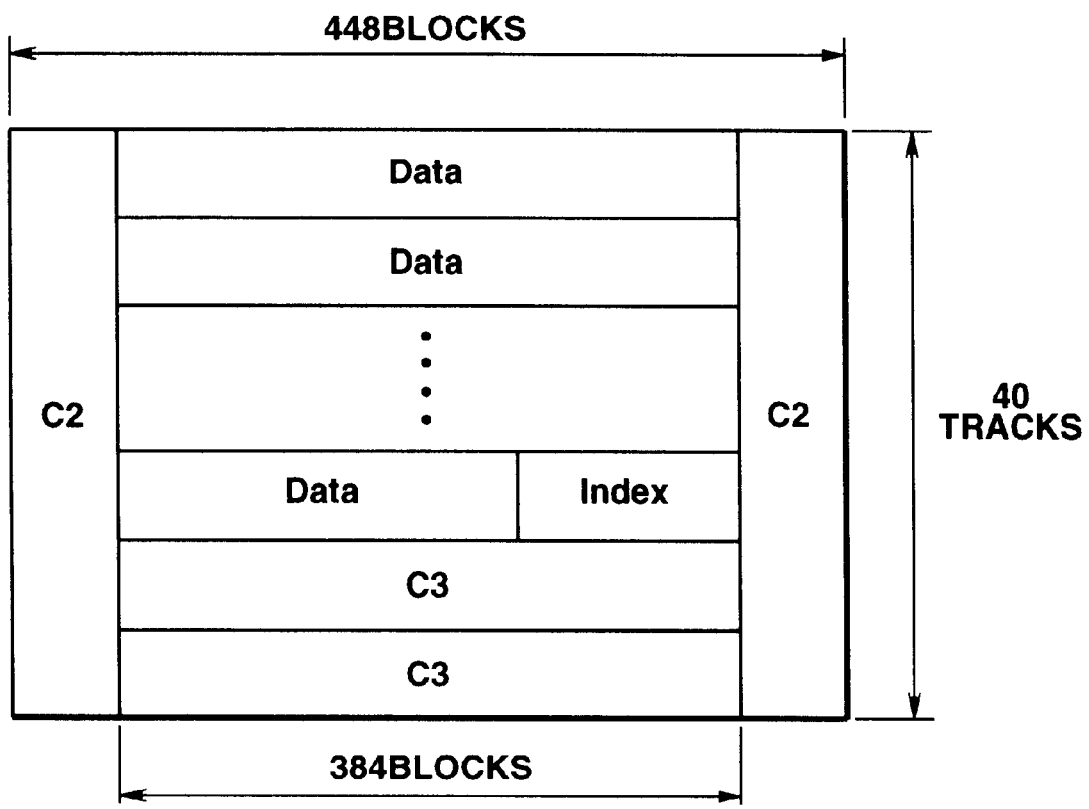
FIG. 6 shows a data structure of 40 tracks forming a unit of data recorded on a magnetic tape by the tape streaming drive of FIG. 1.

The data recorded in the fourth area is 64 bytes by 448 blocks constituted by two-dimensional error correction codes C1, C2 appended to each set of 58 bytes by 348 blocks, that is 22272 bytes, these data being distributed from block to block, as shown in FIG. 5. The error correction codes C1 are recorded by being appended to the block-based main data, as shown in FIG. 5. The error correction code c2 is recorded in two portions which are recorded in 32 blocks at both ends of the main data area of each track.

The tape streaming drive 1 adopts a code structure for error correction having 40 tracks or 20 frames as a unit or group, with two tracks or 942 blocks as a frame. The error correction code C2 of the data string corresponding to the track direction is recorded on each side of the track. The error correction code C3 of the data string in the track width direction is recorded by being allocated to the last two of the above-mentioned 40 tracks. To each unit is appended the index information for discriminating a sequence of data.

As the sub-code are recorded a separator count, as the division information specifying the division of main data, a record count specifying the number of records, an area ID specifying each area defined on the tape format, a frame number specifying a absolute position of the recording unit, the group count specifying the number of recording units, and the check sum.

The ID area A2, shown in FIG. 4B, is explained with reference to FIGS. 7 to 10.

Figure 7:
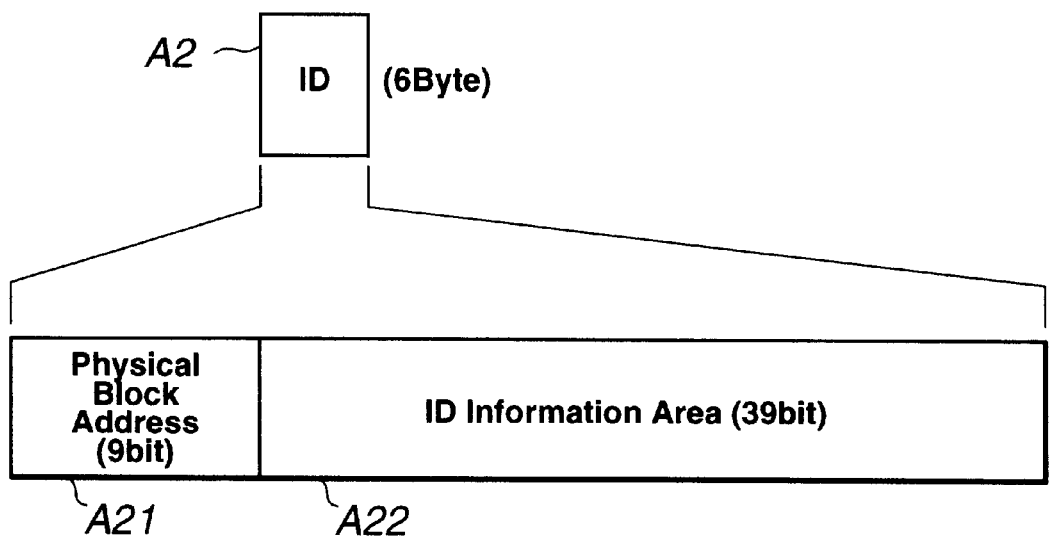
FIG. 7 shows a data structure of an ID area of the magnetic tape.

The ID area A2 has a data structure shown in FIG. 7, and is made up of a 9-bit physical block address A21 and a 39-bit ID information area A22 next following this physical block address A21.

Figure 8:
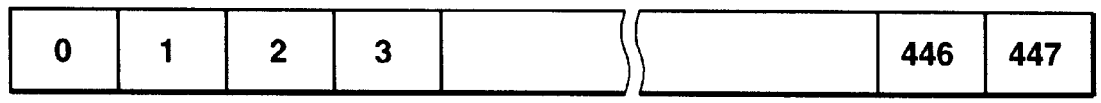
FIG. 8 shows a physical block address number on a sole track of the magnetic tape.

Since the total data areas (A13 and A15) in one track are made up of 448 blocks, the number of the physical block addresses A21 contained in the total data area is 448. The address values are accorded to these 448 physical block addresses A21 so as to increment from 0 to 447 in decimal notation as shown in FIG. 8 from the physical block address A21 at the beginning end of one track.

This makes it possible for the recording/reproducing apparatus to optimally handle the information contained in the ID information area A22 contained in a one-track data area. The data size of the ID information area A22, included in a data area in one track, is 2,184 bytes, as can be found by $$39 \text{ bits} \times 448 \text{ blocks} = 17,472 \text{ bits}$$
$$= 2,184 \text{ bytes}.$$

The sorts of the ID area information stored in the ID information area A22 shown in FIG. 7 are as shown in FIG. 9. The respective items of the ID area information, shown in FIG. 9, are stored by being fitted by a predetermined rule to the ID information areas A22, A22, . . . contained in the data area in each track. For enabling reliable readout of the ID area information by the tape streaming drive, the ID area information of the same sort is recorded plural times in each track in accordance with a predetermined rule.

Referring to FIG. 9, the raw format ID (16 bits) shows types of the basic format concerning the magnetic tape. In the present embodiment, the information such as that on the track pitch, frame data size, number of blocks contained in a track, block data size, tape length, tape thickness or on the tape material, is shown. The logical format ID shows the types of the actually employed recording formats.

The logical frame ID is made up of the last frame ID (1 bit), an ECC frame ID of 1 bit, and a logical frame number in 6 bits. The last frame ID indicates whether or not the current frame including the ID area is the last frame in the group. The ECC frame ID specifies whether or not the recording data of the current frame is the error correction code (ECC).

Each group is made up of 20 frames as described above, with the logical frame number specifying which number frame the frame in question is in the current group.

The partition ID of 16 bits specifies the partition number of the partition containing the current frame.

An area ID of 4 bits indicates to which area belongs the frame in question. The data ID of 4 bits specifies the type of the data processing configuration which is based on the recording format. The N-position and N-repeat define the information concerning data corresponding to the multiple recording mode.

The group count of 24 bits specifies the total number of groups in the current partition up to the group containing the frame in question. The file mark count specifies the total number of file marks contained in the current partition as from the start position up to the current group. The file mark is the information specifying the division of a data file in one partition.

A save set mark count of 32 bits specifies the total number of file marks in the current partition as from the start position up to the current group. The save set mark is the information specifying the division of the data save position in one partition.

A record count of 32 bits denotes the total number of records contained in the current partition as from its start position up to the current group. An absolute frame count of 24 bits denotes the total number of frames contained in the current partition as from its start position up to the current group. There is also provided a reserved area in order to cope with possible future addition of the ID area information.

It is noted that the definition of the ID area information and the numbers of bits accorded to the ID area information items are merely exemplary and can be changed depending on actual use conditions.

Of the ID area information items, shown in FIG. 9, an area ID, which is the main point of the present embodiment, is now explained.

FIG. 10 shows the contents of definition of the area ID. In this case, bit numbers (3-2-1-0) are affixed to four bits making up the area ID. The values of the bit number (3-2-1-0) of [0000], [0001], [0010] and [0011] (FIG. 10) denote a device area, a reference area, a system log area and undefined or reserved, respectively.

In addition, [0100], [0101], [0110] and [0111] denote a data area, an EOD area, undefined and an optional device area for loading/unloading a magnetic tape 12 other than the indispensable areas shown in FIG. 3. This optional device area will be explained subsequently.

In FIG. 10, the numbers is shown in parentheses in the respective columns indicating the numbers of bits of the bit number (3-2-1-0) denote the bit values in decimal notation.

Figure 11:
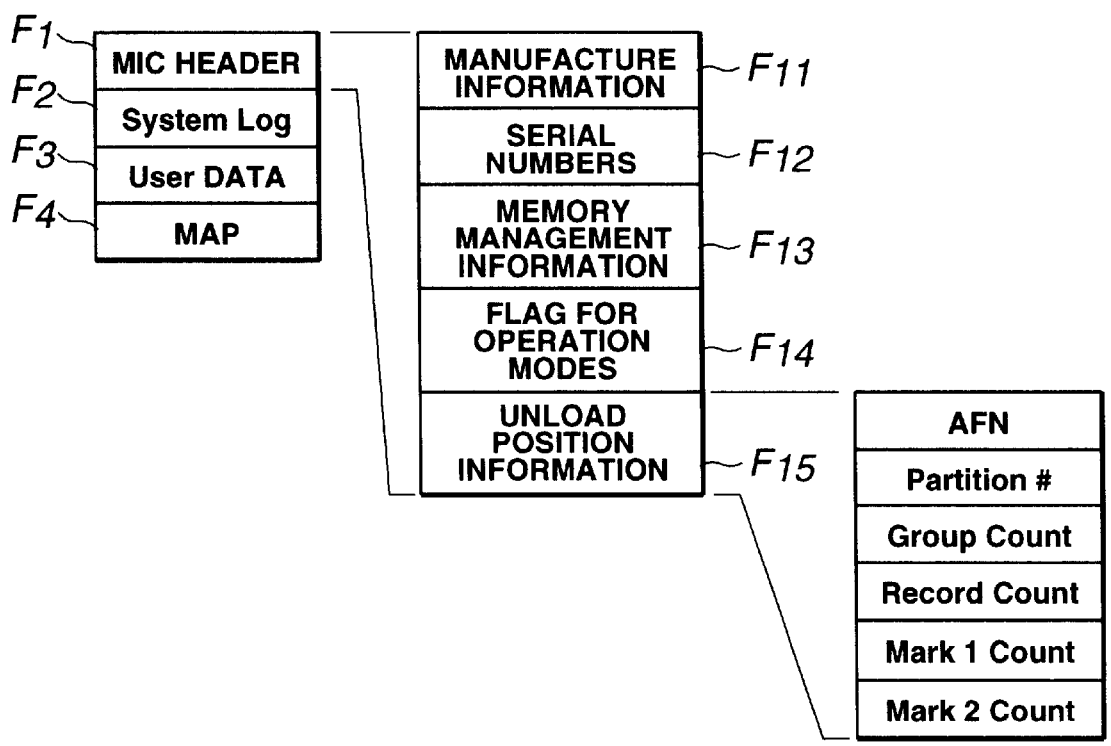
FIG. 11 shows the data structure of data stored in the tape cassette.

In FIG. 11, there is shown a data structure of the MIC having a capacity of, for example, 2 Mbyte. In this area are set fields F1 to F4.

The field F1 is a MIC header in which are written the tape information on initialization and the partition-based information. More specifically, the MIC header is made up of the production information F11 for recording various items of production information, prevailing at the time of manufacture, serial numbers F12, memory management information F13, flags for operational modes F14 and the unloading position information F15.

The unloading position information F15 is mainly constituted by the position information of the magnetic tape 12, prevailing at the time of unloading from the tape streaming drive 1. The unloading position information F15 is constituted by, for example, the absolute frame number AFN, partition numbers (Partition#), group count, recorded count, mark 1 count and mark 2 count.

The field F2 is formulated in meeting with the partitions actually recorded on the magnetic tape 12. In this field F2 is stored each system log in order to record the partition-based system logs. The area of the magnetic tape 12 corresponding to the system log area is configured for recording the information having contents similar to those of the system log area in the MIC.

The field F3 is for user data, that is it holds on memory the information supplied by the user (such as a vender) concerning the tape cassette itself. If necessary, this information is sent to an external host computer 200 for use for pertinent control operations.

The field F4 is a map area in which to store the absolute position information of a variety of data.

The tape streaming drive 1 loads and unloads a tape cassette having a magnetic tape 12 having the data area as described above. In the following, a specified example is shown and accordingly the unloading and loading operations are explained.

Figure 12:
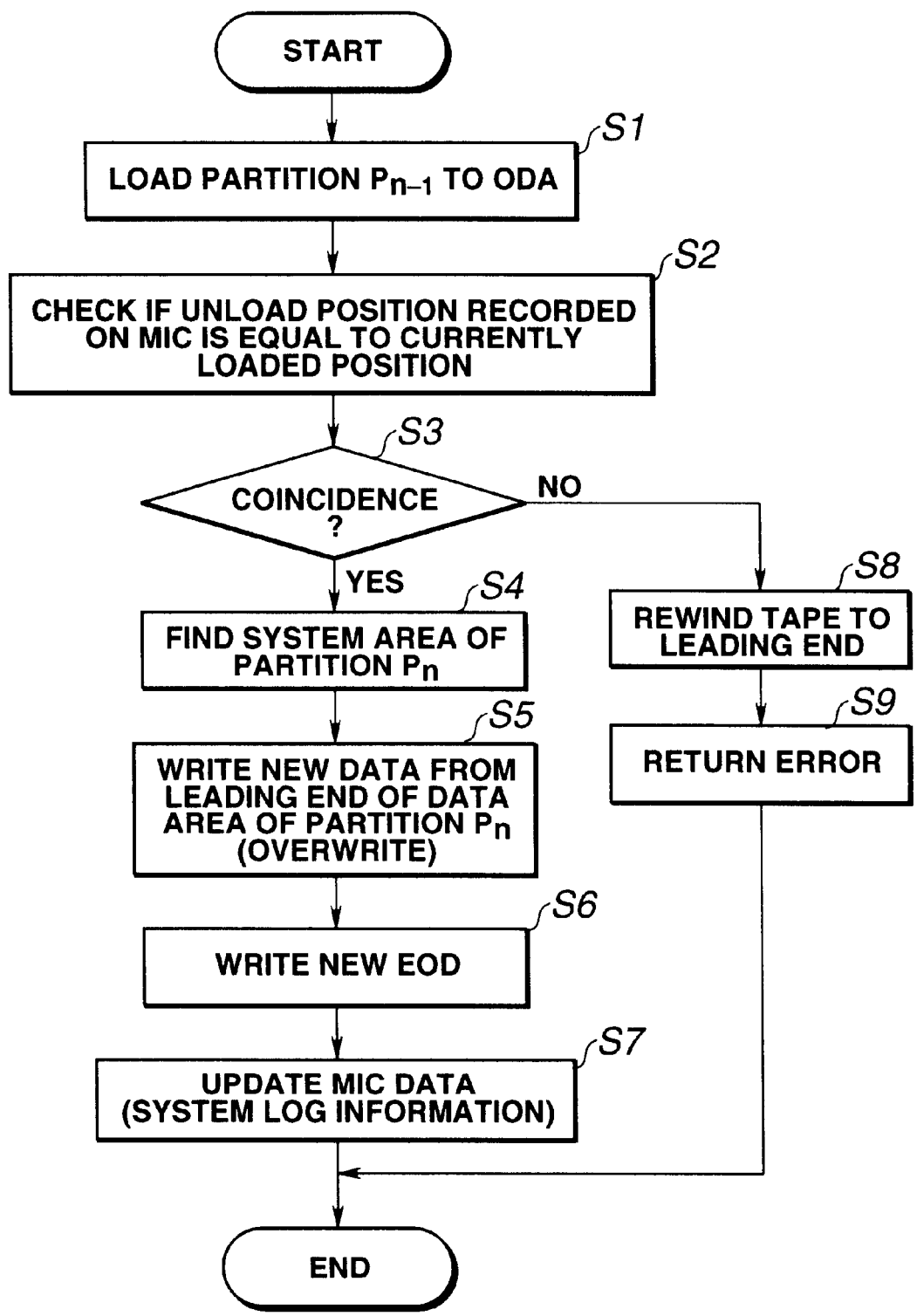
FIG. 12 is a flowchart for illustrating the processing to be performed directly after loading by the above tape streaming drive, more specifically the processing for updating data in a partition provided on the magnetic tape.
Figure 13:
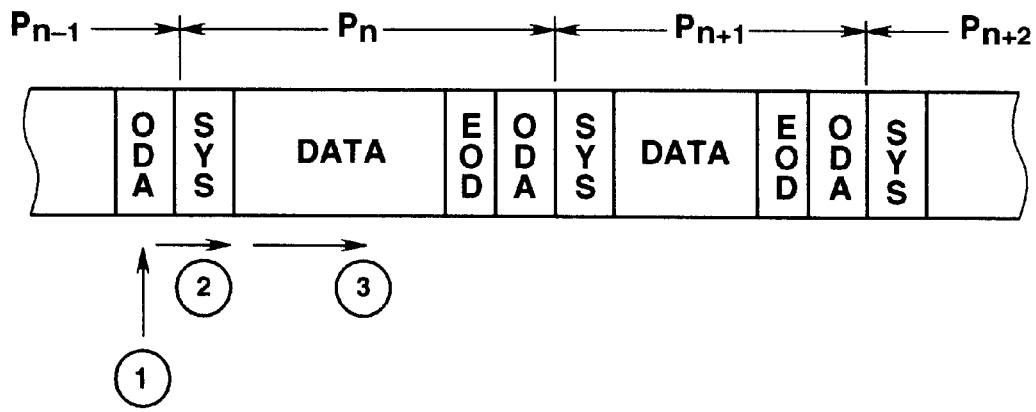
FIG. 13 illustrates the process for updating the data area by the processing for updating data in the partition provided on the magnetic tape.

The flowchart of FIG. 12 shows the sequence of operations in the loading operation in case of updating data recorded in the partition Pn by the tape streaming drive 1. FIG. 13 shows the operations of loading and the feed operation of the magnetic tape 12.

The feed driving control of the magnetic tape 12 is by the motor driving and servo circuit 150, while the driving control of the motor driving and servo circuit 150 is by the system controller 161.

First, the tape streaming drive 1 loads to the ODA of the partition Pn–1, positioned at a time point of loading of the tape cassette, as shown at step S1 of FIG. 12. This processing is that shown at ① in FIG. 13.

It is noted that the magnetic tape is positioned in the optional device area ODA of the partition Pn–1 at the time of loading. This is ascribable to the fact that the magnetic tape has been moved at the time of unloading from the partition Pn as a result of unloading of the tape streaming drive 1. That is to say, it is the partition Pn that has been recorded or reproduced directly before unloading. The tape streaming drive 1 feeds the magnetic tape 12 to the optional device area ODA provided at the trailing end position in the partition Pn–1 directly prior to the partition Pn in question by the unloading operation to eject the tape cassette.

At steps S2 and S3, the unloading position information recorded in the MIC and the position information recorded at the loaded position are checked and compared to each other. For example, the position information in the optional device area ODA is recorded in the ID. The tape streaming drive 1 compares the position information recorded in the ID to that stored in the MIC at the time of unloading. This confirms that the position at the time of unloading coincides with the position confirmed by loading.

If position coincidence is confirmed at step S3, the tape streaming drive 1 searches the system area of the partition Pn, as shown at step S4, in order to read the variety of information items, such as use hysteresis information, recorded in the system area. This processing is that shown at ② in FIG. 13.

After reading the above-mentioned various information items, the tape streaming drive 1 writes new data as from the leading end position of the data area, as shown at step S5. This processing is that shown at ③ in FIG. 13.

After data writing, the tape streaming drive 1 writes new EOD to indicate the tape end position as shown at step S6. The tape streaming drive 1 then updates the data stored in the MIC, for example, the tape use hysteresis information, to terminate data updating, as shown at step S7.

If it is found at step S3 that there is realized no position information coincidence, the tape streaming drive 1 rewinds the magnetic tape up to its beginning position, as shown at step S8. The tape streaming drive 1 then performs error processing, as shown at step S9, to terminate the processing in question.

Figure 14:
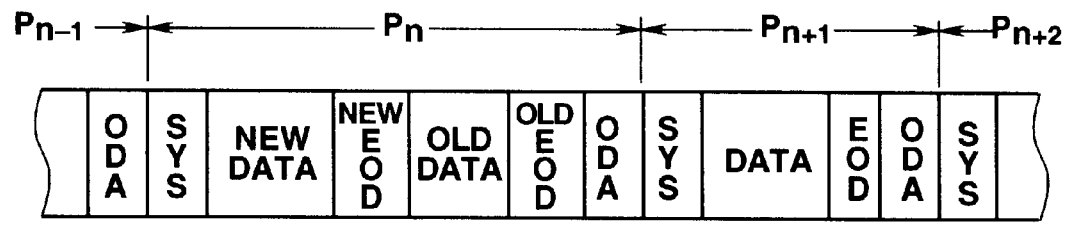
FIG. 14 shows the data structure in the partition of the data area which has been updated by the updating processing of data in the partition provided on the magnetic tape.

Since the data writing as described above leads to overwriting of new data on the previously recorded data, there are kept recorded in the data area the overwritten data (New DATA), new EOD (New EOD), old data invalidated by overwriting (Old DATA) and original EOD (Old EOD), as shown in FIG. 14.

Since the old data (Old DATA) area is naturally fractionated partway by the overwritten data (New DATA), data of the old data (Old DATA) downstream of the overwriting data (New DATA) cannot be read out.

Thus, the data area is constituted by valid data and invalid data continuously formed in the recording/reproducing direction of the valid data.

On issuance of an unloading command during recording or reproduction, the tape streaming drive 1 embodying the present invention feeds the magnetic tape 12 to the optional device area ODA provided at the trailing end position of the partition directly previous to the partition being processed to eject the tape cassette.

It may also be contemplated to feed the magnetic tape 12 to the optional device area ODA provided at the trailing end position in the partition in question for which the unloading command has been issued in order to eject the tape cassette.

Figure 15:
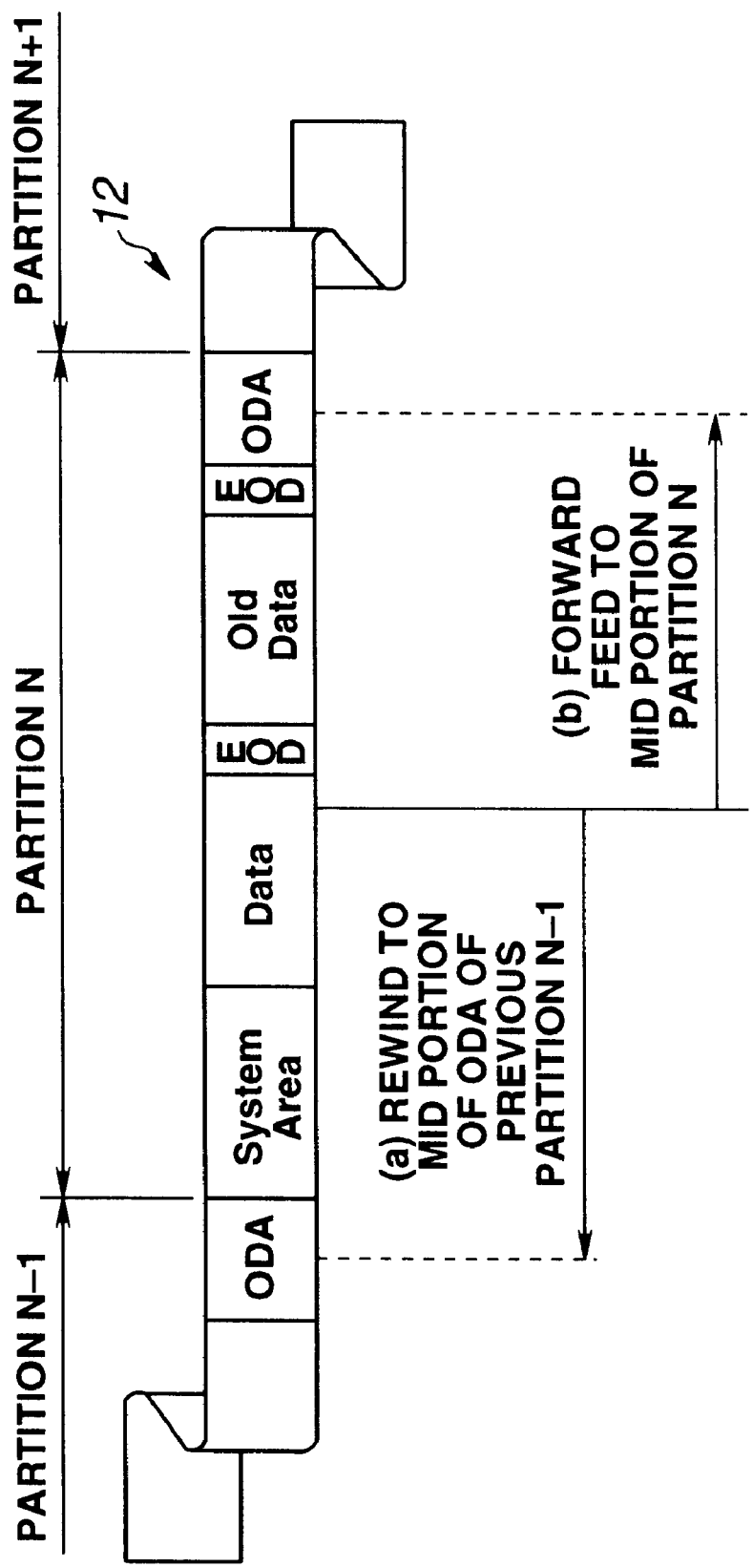
FIG. 15 shows feeding the magnetic tape on issuance of an unloading command for a case (a) wherein the tape is fed to an optional device area ODA in the directly previous partition N-1 and for a case (b) wherein the tape is fed to an optional device area ODA in the current partition N.

FIG. 15 shows feeding the magnetic tape on issuance of an unloading command for a case (a) wherein the tape is fed to an optional device area ODA in the directly previous partition N–1 and for a case (b) wherein the tape is fed to an optional device area ODA in the partition N prevailing at the time of issuance of the unloading command. The partition N, which prevailed directly before issuance of the unloading command, is updated by the new data and constituted by a data area. Specifically, the partition N is constituted by valid data (New DATA) and invalid data (Old DATA), as shown in FIG. 14.

If the magnetic tape 12 is to be fed to the optional device area ODA in the current partition N prevailing at the time of issuance of the unloading command, and the magnetic tape is to be fed to the partition in which the data has been updated, as described above, the magnetic tape needs to pass through the area where the invalid data exists, as shown in FIG. 15.

However, the invalid data (Old DATA) can, of course, not be read. Therefore, if such data area is traversed, the tape streaming drive 1 is rendered unable to comprehend the current position, as a result of which it cannot search the targeted optional device area ODA and hence cannot unload the tape cassette.

That is, if the tape streaming drive 1 feeds the magnetic tape 12 to the optional device area ODA of the partition N–1 directly before the partition N for which the unloading command has been issued, as shown in FIG. 15, the invalid area is not traversed even if the data is updated, thus reliably unloading the tape cassette.

Since there is no invalid data in the magnetic tape 12 fed by way of the unloading operation, there is no necessity for the tape streaming drive 1 to perform exceptional operations in order to check whether or not invalid data is present in the feed process, thus expediting the unloading operation. That is, the tape strearming drive 1 can unload the tape by the same sequence of operations for any partitions.

If the magnetic head is positioned in the invalid data (Old DATA), and the power of the device is down, an EOD is encountered before finding the system area (SYS) even if, on restoration, the magnetic heads are moved in the opposite direction relative to the recording/reproducing direction, thus causing position errors.

Figure 16:
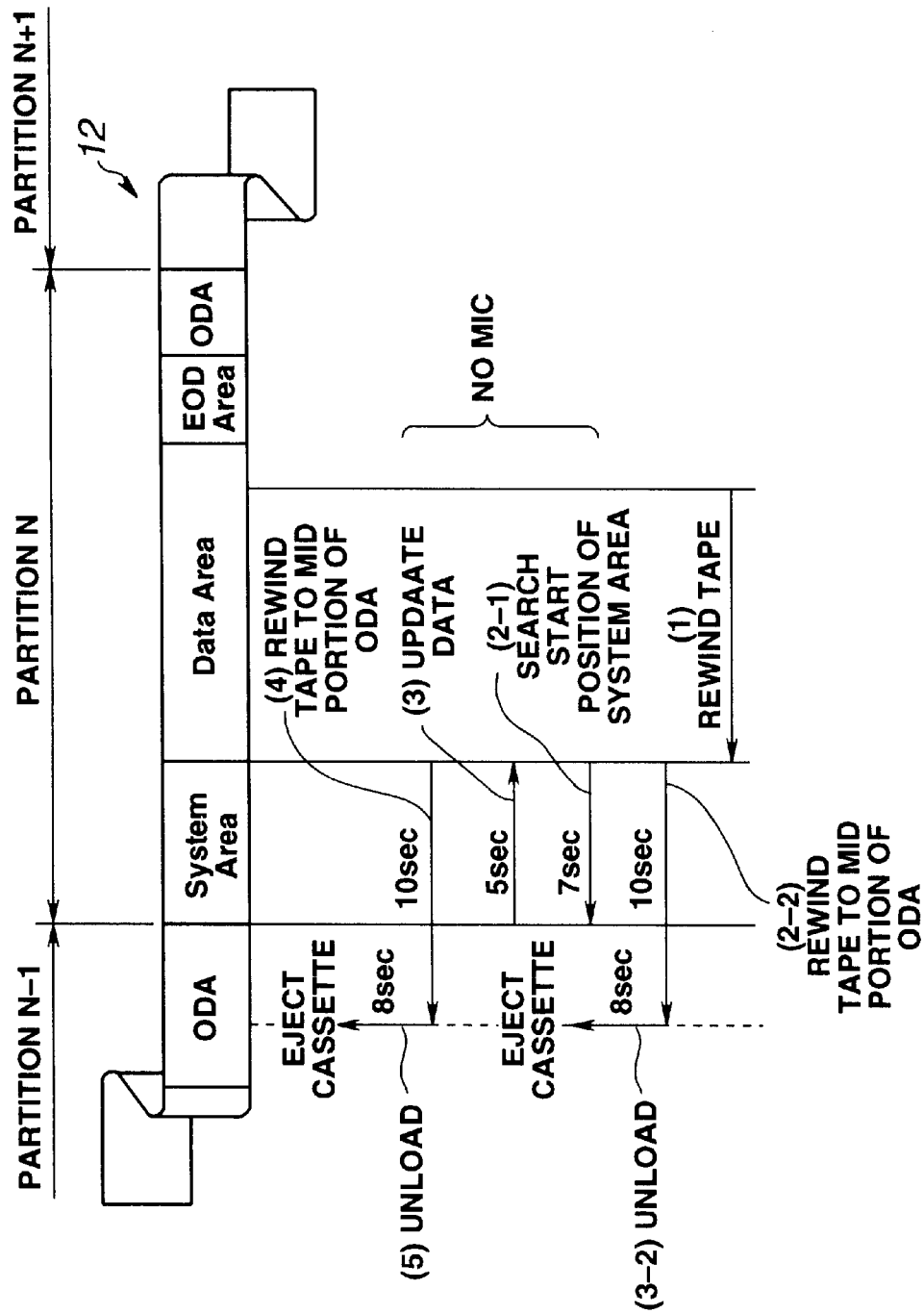
FIG. 16 shows an operation when the tape streaming drive unloads the tape cassette as various sorts of information are stored in the MIC and as various sorts of information are being recorded on the magnetic tape.

The operational processes of the unloading and loading are now explained. FIG. 16 shows the process as from the state in which the tape streaming drive is positioned at the current data area until the unloading of the tape cassette. In FIG. 16, numerals entered in parentheses () denote the operational sequence of the tape streaming drive.

In FIG. 16, there are also shown an unloading operation of unloading a tape cassette having a MIC as various information items are stored in the MIC, and an unloading operation of unloading a tape cassette after recording various items of the information in the system area provided in the partition.

First, the operation of unloading a tape cassette having a MIC, as various information items are stored in the MIC, is explained.

The tape streaming drive 1 rewinds the magnetic tape from the current data area to the beginning end of the data area (1). The start of this rewinding is executed by a command from the host computer 200 shown in FIG. 1.

Next to rewinding of the magnetic tape 12 to the beginning end of the data area, the magnetic tape 12 is rewound to a mid position of the optional device area ODA provided in the partition directly ahead of the partition considered to be the position of ejection (2-2).

The tape streaming drive 1 then holds on memory the tape use hysteresis information (system log) and the unloading position information as the information on the unloading position in the MIC of the tape cassette. The unloading position information is to be the partition number, as an example.

By the unloading operation, the tape cassette is ejected from the tape streaming drive 1 (3-2). For example, the tape streaming drive 1 moves the tape cassette within the drive 1, as a tape cassette ejecting operation next following the threading operation, such as in an upward direction, for ejecting the tape cassette. The time required in a series of operations from (2-2) to (3-2) is 18 sec.

Thus, the tape streaming drive 1 can store the position information in the MIC so that it can move the tape on next re-loading to the partition Pn where the tape has been ejected last time, based on the unloading position information stored in the MIC.

Since the magnetic tape need not be rewound in its entirety on the tape streaming drive 1, it is possible to reduce the time of unloading of the tape cassette.

The tape use hysteresis information can be recorded in the system area provided in each partition. In the case of the tape cassette not having the MIC, the tape use hysteresis information is recorded in the system area provided in each partition. The unloading operation at this time is the operation from (1) to (5).

In the operation of unloading for recording the use hysteresis information, the magnetic tape 12 is similarly rewound from the current data area to the leading end of the data area in question (1).

After rewinding to the leading end of the data area, the recording start position of the system area is searched for recording the hysteresis information in the system area (2-1). The tape use hysteresis information is recorded in the system area.

After data updating of the system area comes to a close, the magnetic tape is rewound to a mid position of the optional device area ODA provided in the partition Pn−1 directly preceding the partition Pn for ejecting the tape cassette (4).

The tape streaming drive 1 ejects the tape cassette by the unloading operation (5).

The time required for a sequence of operations ((2-1) to (5)) in case of recording the tape use hysteresis information in the system area is 30 sec.

As compared to the case of the tape cassette having the MIC as described above, the operation of recording the use hysteresis information in the system area ((2-1) to (3)) is superfluous, such that there is produced difference of 12 sec.

By storing the use hysteresis information or the position information in the MIC, it is unnecessary for the tape streaming drive to store the information in the system area, thus enabling the unloading operation to be completed at an elevated speed.

On the other hand, if data cannot be recorded on the magnetic tape 12 due to a data writing inhibiting tab of the tape cassette, the information can, of course, not be written with the system not having the MIC and which is adapted to write the information directly on the magnetic tape 12. Conversely, with the system of writing the various items of the information on the MIC, the tape use hysteresis information can be stored in the MIC without regard to the operating state of the writing inhibiting tab. Thus, in the system of writing various items of the information on the MIC, reference can be had to the tape use hysteresis information stored in the MIC.

Figure 17:
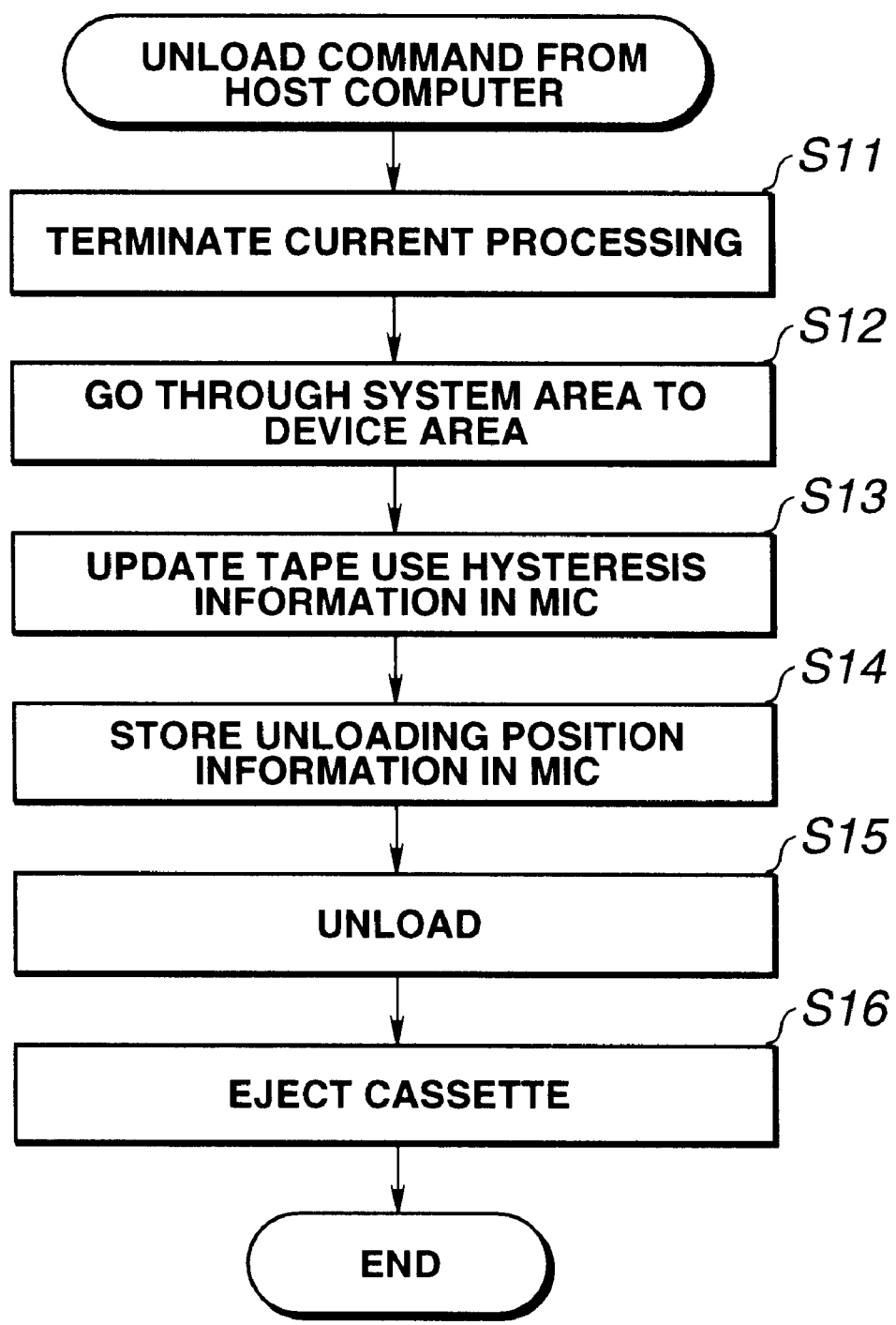
FIG. 17 is a flowchart showing a processing technique when the tape streaming drive unloads the tape cassette.

The tape streaming drive 1 allows the unloading position information and the tape use hysteresis information to be stored in the MIC in accordance with the flowchart shown in FIG. 17.

After an unloading command has come from the host computer 200, shown in FIG. 1, the system controller 161 terminates the processing, then going on, as shown at step S11.

The system controller 161 issues a control command to the motor driving and servo circuit 150 to rewind the magnetic tape 12 so that the system area provided at the beginning end of the partition being processed is traversed and the optional device area ODA of the partition directly ahead of the firstly-stated partition is reached.

After rewinding the magnetic tape 12, the system controller 161 causes the tape use hysteresis information and the unloading position information to be recorded in the MIC of the tape cassette, as shown at step S12 and then at step S13.

Next, at step S15, the system controller 161 performs the unloading operation. The system controller 161 then ejects the tape cassette at step S16 to terminate the unloading.

Figure 18:
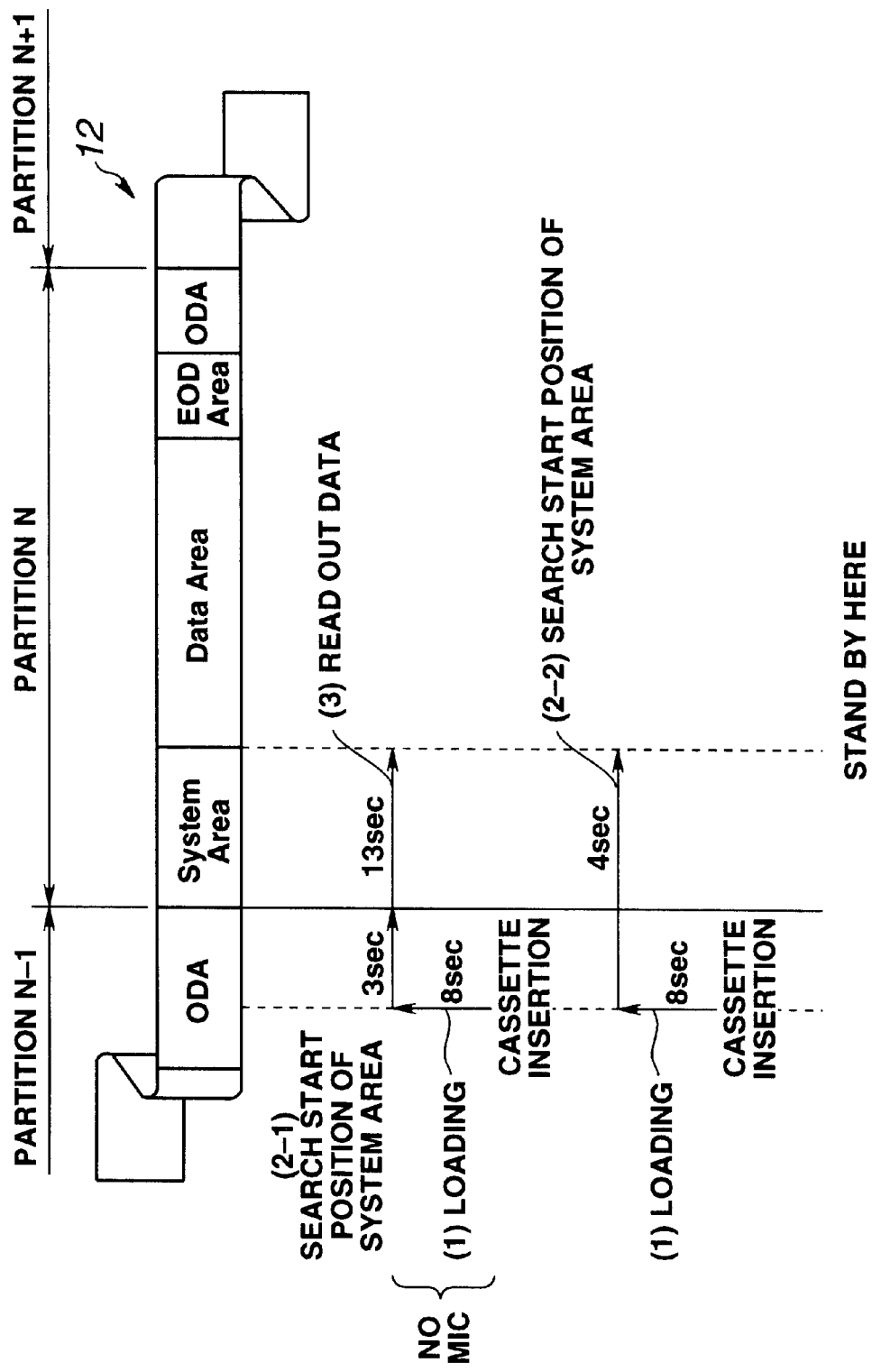
FIG. 18 shows loading the tape cassette by the tape streaming drive as various sorts of the information are stored in MIC and as the various sorts of information recorded in the system area of the magnetic tape are being recorded on the magnetic tape.

The loading operation is now explained. FIG. 18 shows the operating process in which the tape cassette, the magnetic tape 12 of which has been rewound by the previous unloading operation up to the optional device area ODA of the partition N−1, is loaded. In FIG. 18, the numerals entered in parentheses () denote the operational sequence of the tape streaming drive.

FIG. 18 shows the operation of loading the tape cassette having the MIC, as the various items of the information stored in the MIC are read out, and the operation of loading the tape cassette not having the MIC, as the various items of the information stored in the system area provided in the partition are read out.

The operation of loading the tape cassette having the MIC, as the various items of the information stored in the MIC are read out, is first explained.

The tape streaming drive 1 loads a tape cassette introduced thereon. The loading moves the tape cassette introduced on the tape streaming drive 1 to a desired position and performs threading.

The tape streaming drive 1 then reads the position information recorded in an ID of the optional device area to compare the position information to the unloading position information recorded in the MIC of the tape cassette. In case of coincidence between the two, the position of previous processing is searched. Specifically, the tape streaming drive 1 feeds the magnetic tape 12 in the recording/reproducing direction as from the current partition N−1, in order to search a system area provided in the next partition N, which was processed directly before ejection of the tape cassette (2-2), thereby to set a stand-by state.

Since the tape streaming drive 1 refers to the tape use hysteresis information for directly previous processing stored in the MIC, this search can be achieved by simply confirming the last position of the system area.

The time required for this sequence of operations ((1)→(2-2)) is 12 sec.

Based on the position information stored in the MIC, the tape streaming drive 1 moves to a partition N processed last time.

Since it is unnecessary for the tape streaming drive 1 to move to the position of previous processing as from the leading end of the tape, tape cassette loading can be performed speedily.

If the magnetic tape 12 has been moved to the partition N processed last time, as the tape use hysteresis information recorded in the system area is read out, the tape streaming drive 1 loads the tape cassette introduced thereon, as when a variety of information items have been stored in the MIC (1).

For reading the tape use hysteresis information, the tape streaming drive 1 searches the recording start position of the system area carrying the tape use hysteresis information (2-1).

On reaching the leading position of the system area, the tape streaming drive 1 reads out the tape use hysteresis information recorded in the system area in question (3). On termination of data readout, the tape streaming drive 1 sets the readout end position as the system area end position, and establishes a stand-by state.

For example, if the use hysteresis information recorded in the system area has been read to terminate the loading operation, the time required in the sequence of operations ((1) to (2-2)) is 24 sec.

As compared to the case of a tape cassette having the MIC, the time corresponding to the operation (3) of reading out the tape use hysteresis information from the system area is superfluous, such that the time 12 sec longer is consumed.

Thus, with the present tape streaming drive 1, since the tape use hysteresis information is stored in the MIC and hence the tape use hysteresis information need not be read out from the system area, the loading operation can be completed expeditiously.

Figure 19:
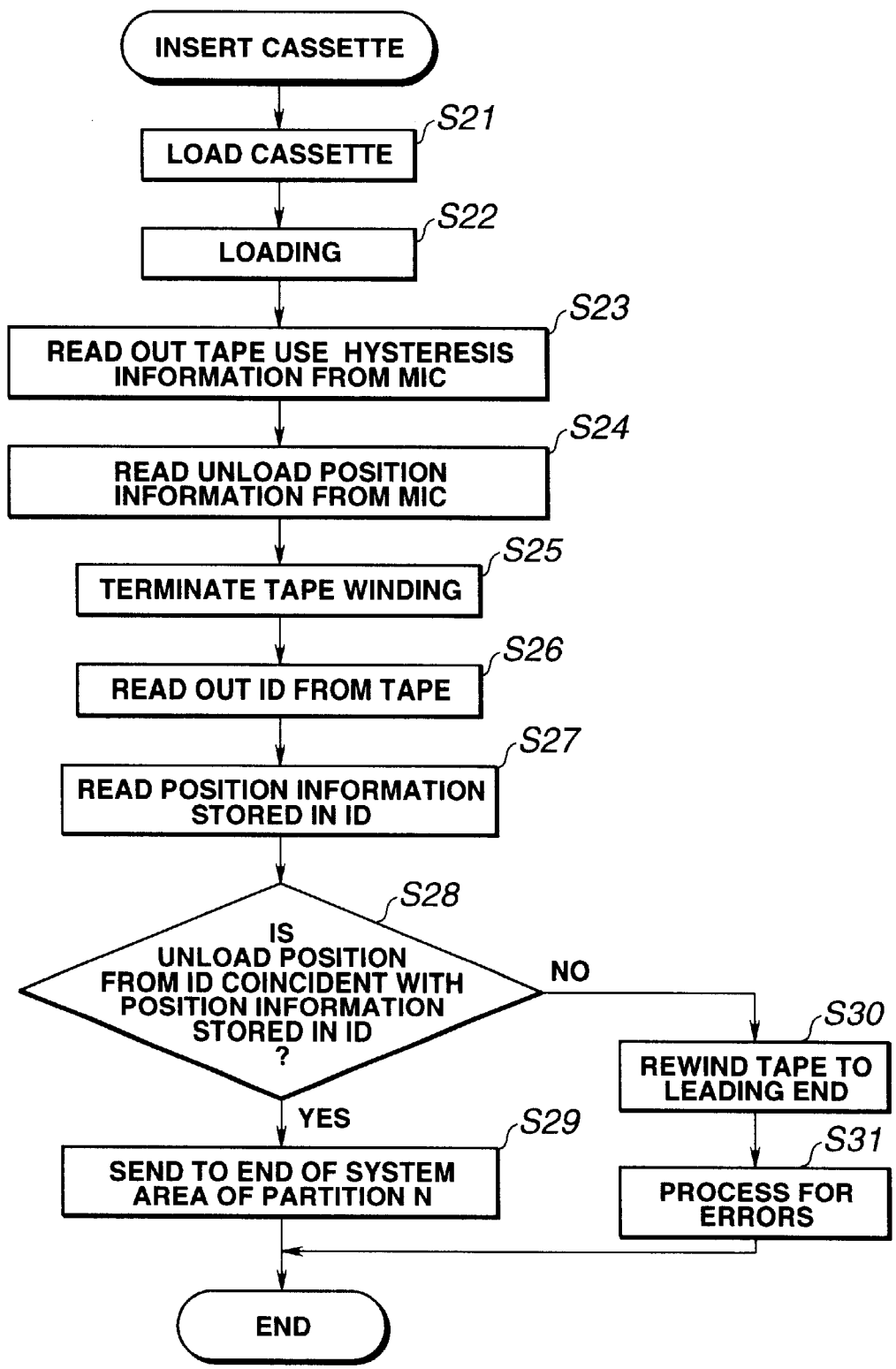
FIG. 19 is a flowchart showing the processing sequence used when the tape streaming drive loads the tape cassette.

For example, the tape streaming drive 1 reads out the unloading position information and the tape use hysteresis information in accordance with the flowchart shown in FIG. 19.

After insertion of the tape cassette, the tape streaming drive 1 introduces the tape cassette, as shown at steps S21 and S22, in order to effect the loading.

After loading, the system controller 161 reads out the tape use hysteresis information and the unloading position information from the MIC of the tape cassette, as shown at steps S23, S24.

After reading these various items of information from the MIC, the system controller 161 controls the motor driving and servo circuit 150 to wrap the tape around the rotary head 131 shown in FIG. 1, as shown at step S25. The system controller 161 then reads out the ID recorded in the optional device area ODA, as shown at step S26.

The system controller 161 reads out the position information stored in the ID, as at step S27, in order to compare the position information read out from the ID to the unloading position information being read out from the MIC. By this comparison, the system controller 161 checks whether or not the position of unloading stored in the MIC coincides with the current loading position.

If, as a result of comparison at step S27, there is the coincidence of the read-out position information, the system controller 161 feeds the magnetic tape 12 by the motor driving and servo circuit 150 so that the magnetic tape 12 reaches the last position of the system area provided in the partition directly after the partition in question in the recording/reproducing direction to terminate the loading operation.

If, as a result of comparison at step S28, there is found no position information coincidence, the system controller 161 rewinds the magnetic tape 12 up to its beginning end to perform error processing to terminate the processing in question.

The purpose of forced rewinding to the beginning end of the magnetic tape 12, performed during the error processing, is for checking a reel lock is not intentionally disengaged to rewind the tape.

Figure 20:
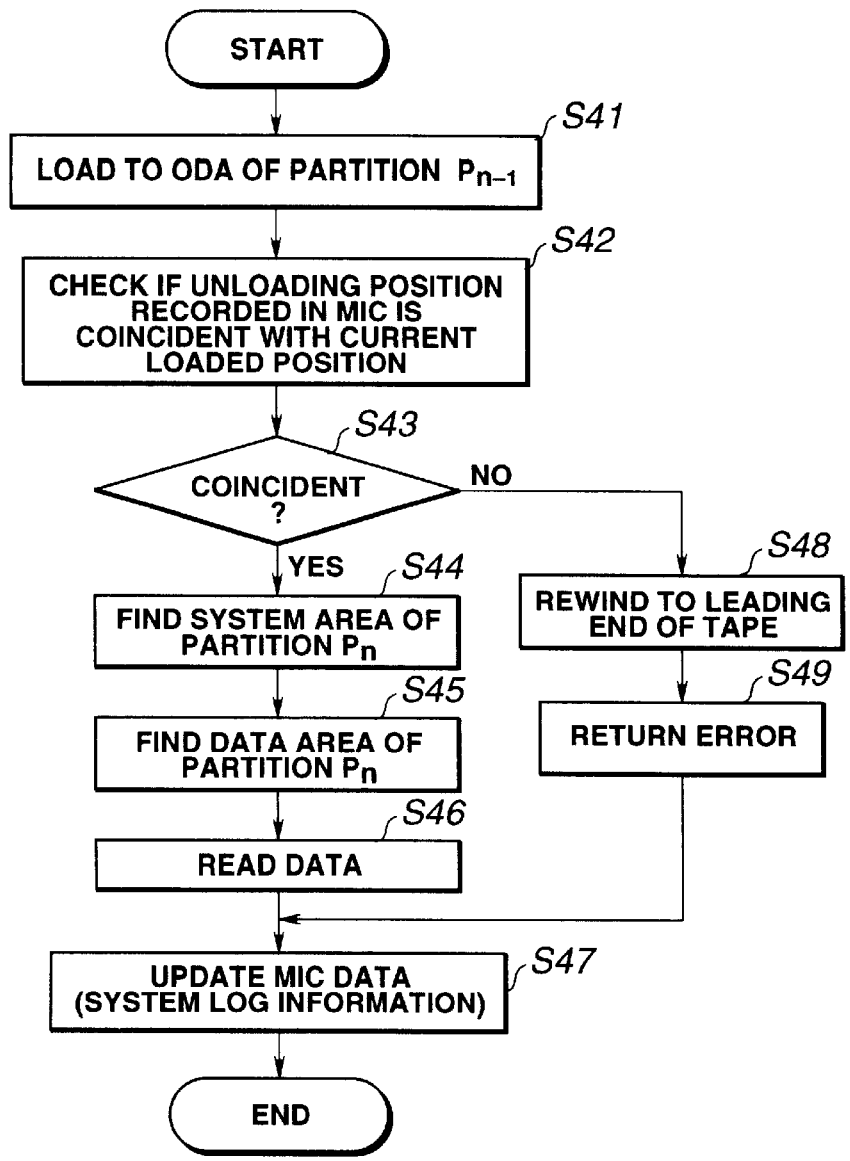
FIG. 20 shows the processing performed directly after loading by the tape streaming drive for reading data in the partition provided on the magnetic tape.
Figure 21:
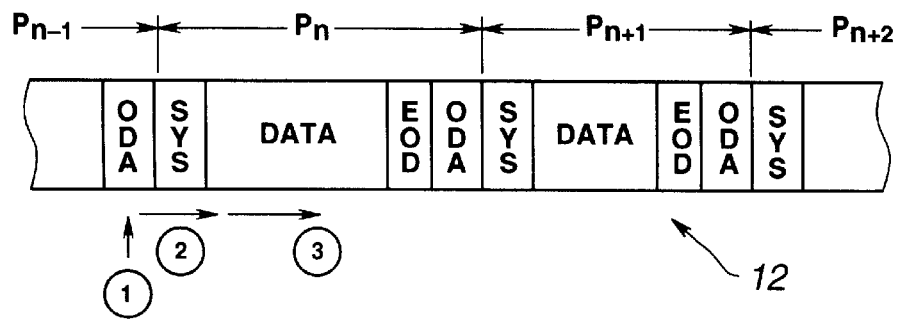
FIG. 21 illustrates the process of reading out data in the partition provided on the magnetic tape.

If data recorded in the data area directly after loading is to be read, processing as shown in the flowchart of FIG. 20 is performed. FIG. 21 shows the feed operation for the magnetic tape 12.

First, the tape streaming drive 1 loads the tape to an optional device area ODA of the partition Pn−1, as shown at step S41 of FIG. 20. This processing is shown at ① in FIG. 21.

Next, at steps S42 and S43, the system controller 161 checks the unloading position information recorded in the MIC and the position information recorded in the ID to compare the two information signals.

If coincidence is found at step S43, the system controller 161 searches the system area of the partition Pn directly following the partition pn−1. The system controller 161 then searches the data area. This processing is shown at ② to ③ in FIG. 21.

If the data area is found at step S45, data recorded in the data area in question is read, as shown at step S46. The system controller 161 then updates the data stored in the MIC.

If position information coincidence has not been found at step S43, the system controller 161 rewinds the magnetic tape 12 to its beginning end, as shown at step S48. The system controller 161 then performs error processing to terminate the processing in question.

As described above, the tape streaming drive 1 feeds the magnetic tape 12 from the partition now being processed to the optional device area ODA provided at the last position in the partition directly before the partition in question, so that, for unloading the tape cassette, the magnetic head is positioned facing the optional device area ODA of the directly previous partition, and so that, on loading the tape cassette, the magnetic head in positioned in register with the partition directly previous to the partition processed last time, thus enabling fast unloading and loading.

With the tape streaming drive 1, when the tape cassette carrying the MIC is unloaded, the unloading position information and the tape use hysteresis information are stored in the MIC so that there is no necessity of recording the above position information and the tape use hysteresis information in the system area to enable fast unloading and loading of the tape cassette.

Moreover, in ejecting the tape cassette, the tape can be moved from the partition in question to the optional device area ODA of the directly previous partition, and hence there is no necessity of performing exceptional processing of discriminating the invalid data, so that unloading and loading operations can be performed speedily and reliably.

Figure 22:
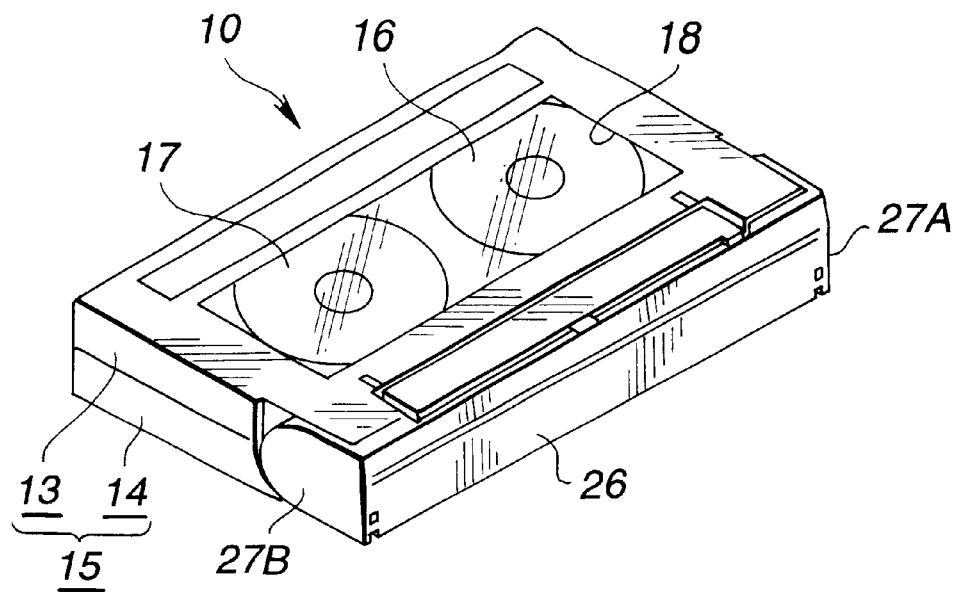
FIG. 22 is a perspective view showing the structure of a tape cassette fitted with the tape streaming drive.
Figure 23:
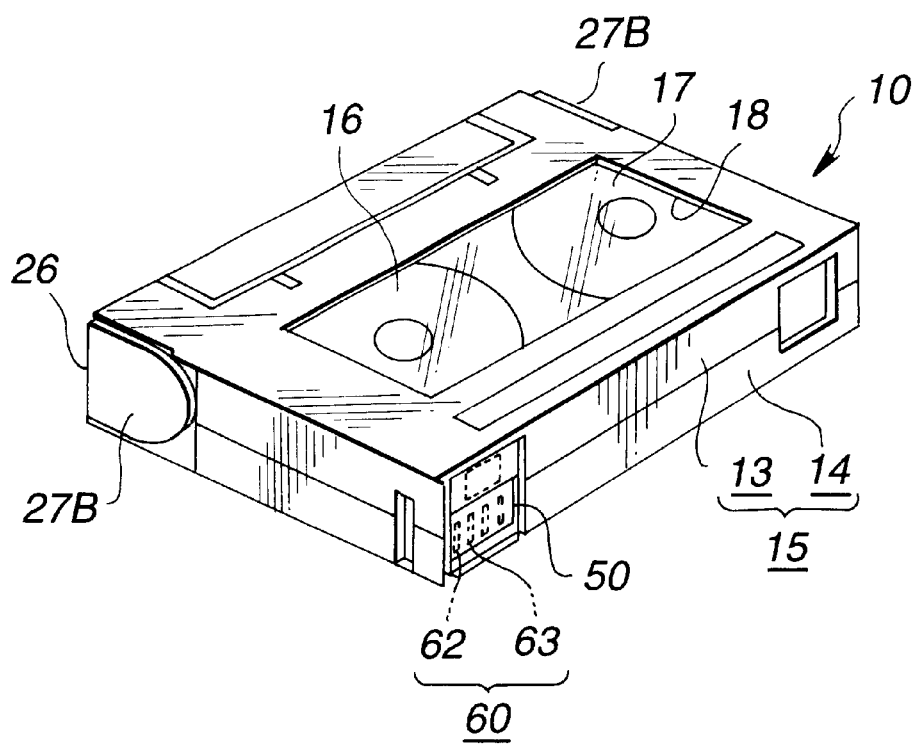
FIG. 23 is a perspective view showing the structure of the tape cassette fitted with the tape streaming drive looking from the back side.

FIGS. 22 and 23 illustrate the structure of a tape cassette loaded on a tape streaming drive embodying the present invention.

As shown in FIGS. 22 and 23, an upper cassette half 13 and a lower cassette half 14, formed of a synthetic resin material in the shape of substantially rectangular shallow saucers, are combined together by plural set screws so that the opening ends thereof face each other to form a substantially box-shaped main cartridge body unit 15. Within this main cartridge body unit 15 are rotatably housed, in a side-by-side relation in its longitudinal direction, a tape supply reel 16 and a tape take-up reel 17, around which are placed a magnetic tape 12.

The main cartridge body unit 15 is provided with a rectangular display window 18 which is formed by partially cutting off the top surface of the upper cassette half 13 constituting the upper surface of the main cartridge body unit. Thus, the state of the magnetic tape 12 placed around the tape supply reel 16 and the tape take-up reel 17 housed within the main cartridge body unit 15 can be checked visually from outside. The main cartridge body unit 15 is provided with hub fitting holes in association with the tape supply reel 16 and the tape take-up reel 17, although these hub fitting holes are not shown. These hub fitting holes are formed in the lower cassette half 14 constituting the bottom surface of the main cartridge body unit 15 for exposing the hubs of the tape supply reel 16 and the tape take-up reel 17 partially to outside and for restricting rotation of the tape supply reel 16 and the tape take-up reel 17. In the bottom surface of the lower cassette half 14 are formed various discriminating holes, such as tape length detection holes or tape type discrimination holes for discriminating the type of the magnetic tape 12.

The tape supply reel 16 and the tape take-up reel 17 are constituted by cylindrically-shaped hubs, around which are wound the magnetic tape 12, and a disc-shaped flange provided on one side of the hubs. The tape supply reel 16 and the tape take-up reel 17 are rotatably housed in the main cartridge body unit 15 by the hubs engaged in the hub fitting holes in the main cartridge body unit 15. The tape supply reel 16 and the tape take-up reel 17 are prevented form sporadic movements in the main cartridge body unit 15 by the rotational center portions of the hubs being biased by reel retention springs and reel retention plates, not shown, towards the lower cassette half 14.

On the main cartridge body unit 15 is rotatably assembled a lid member 26 adapted for closing the front side of the main cartridge body unit 15 adapted for exposing the magnetic tape 12 to outside. The lid member 26 is of substantially the same length as the width of the main cartridge body unit 15 and is formed in a substantially rectangular shape in its entirety. The lid member 26 has both ends formed as-one with sidewall sections 27A, 27B constituting pivot portions for the lid member. The inner sides of the sidewall sections 27A, 27B are formed as-one with a pin shaft rotatably supported by the main cartridge body unit to permit the lid member to open or close the front side of the main cartridge body unit 15.

The tape cassette 10 has, in its rear surface, a terminal opening 50, in which is loaded an auxiliary storage device 60. This auxiliary storage device 60 is made up of a non-volatile memory MIC 62, mounted on a wiring substrate, and plural contact terminals 63 formed on the MIC 62 so as to be used as plural contact terminals 63.

The MIC 62 is constituted by storage elements and an input/output controller for controlling data input/output with a writing/readout controller 163 of the tape streaming drive connected via the contact terminals 63 and a connector, not shown, to the MIC 62 during recording.

What is claimed is:

1. An apparatus for recording data on a tape cassette and/or reproducing said data from said tape cassette holding therein a tape-shaped recording medium having a plurality of partitions in each of which is recorded data, the apparatus comprising:

running control means for controlling running of said tape-shaped recording medium; and system contro lling means for controlling said running control means so that said tape cassette is ejected from said apparatus after moving said tape-shaped recording medium to an ejection area provided at a last position of a partition of said plurality of partitions directly preceding a currently prevailing partition, wherein said partition directly preceding said currently prevailing partition is ahead of a leading end of data within said currently prevailing partition, said taoe cassette includes a storage portion for storing information data relating to said tape-shaped recording medium independently of said tape-shaped recording medium and information data writing means for storing said information data in said storage portion, said system controlling means moves said tape-shaped recording medium by controlling said running control means to said ejection area, and said information data writing means writes partition position information in said storage portion prior to a movement to said ejection area of said tape-shaped recording medium.

2. The apparatus as set forth in claim 1, wherein said tape-shaped recording medium includes a plurality of recording tracks divided into a plurality of blocks, each of said plurality of blocks including a data area for recording main data and a subcode area for recording subcodes and position information.

3. The apparatus as set forth in claim 1, further comprising:

information data readout means for reading said information data stored in said storage portion, wherein said system controlling means moves said tape-shaped recording medium to a predetermined tape position based on said partition position information read from said storage portion by said information data readout means on reloading of said tape cassette.

4. The apparatus as set forth in claim 1, wherein said system controlling means compares said partition position information stored in said storage portion to said partition position information recorded on said tape-shaped recording medium for returning said tape-shaped recording medium to a leading end by controlling said running control means.

5. The apparatus as set forth in claim 1, wherein when ejecting said tape cassette, said information data writing means writes system information and use information in a system area provided in one of a recorded and reproduced partition in said storage portion.

6. The apparatus as set forth in claim 1, wherein said ejection area is provided at a last position of each of said plurality of partitions except a last partition and is provided ahead of a leading end partition.

7. A method for ejecting a tape cassette holding therein a tape-shaped recording medium having a plurality of partitions in each of which is recorded data, comprising the steps of:

moving said tape-shaped recording medium to an ejection area provided in a last position of a partition of said plurality of partitions directly previous to a current partition, wherein said partition directly previous to said current partition is ahead of a leading end of data within said current partition, and said tape cassette includes a storage portion for storing information data concerning said tape-shaped recording medium;

writing in said storage portion position information of a partition prior to a movement to said ejection area of said tape-shaped recording medium; and ejecting said tape cassette after said tape-shaped recording medium is moved to said ejection area.

* * * * *